(12) United States Patent
Ishiwata et al.

(10) Patent No.: US 7,173,793 B2
(45) Date of Patent: Feb. 6, 2007

(54) RECORDING HEAD, RECORDING HEAD MANUFACTURING METHOD, COMBINED HEAD AND MAGNETIC RECORDING/REPRODUCTION APPARATUS

(75) Inventors: Nobuyuki Ishiwata, Tokyo (JP); Hiroaki Honjo, Tokyo (JP); Tamaki Toba, Tokyo (JP); Shinsaku Saito, Tokyo (JP); Yoshihiro Nonaka, Tokyo (JP); Tsutomu Ishi, Tokyo (JP); Mikiko Saito, Tokyo (JP); Keishi Ohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 10/911,578

(22) Filed: Aug. 5, 2004

(65) Prior Publication Data
US 2005/0185339 A1 Aug. 25, 2005

Related U.S. Application Data

(62) Division of application No. 09/748,214, filed on Dec. 27, 2000, now Pat. No. 6,795,271.

(30) Foreign Application Priority Data
Jan. 5, 2000 (JP) .................... 2000-490

(51) Int. Cl.
*G11B 5/147* (2006.01)

(52) U.S. Cl. ..................................... 360/126

(58) Field of Classification Search ............... None
See application file for complete search history.

(56) References Cited

U.S. PATENT DOCUMENTS 6,063,512 A 5/2000 Osaka et al.

(Continued)

FOREIGN PATENT DOCUMENTS

JP S62-222415 A 9/1987

(Continued)

OTHER PUBLICATIONS

R.P. Hunt, "A Magneoresistive Readout Transducer", IEEE Transaction on Magnetics, vol. Mag-7, No. 1, Mar. 1971 with Abstract.

(Continued)

*Primary Examiner*—Robert S. Tupper
(74) *Attorney, Agent, or Firm*—Sughrue Mion, PLLC

(57) ABSTRACT

A recording head is a magnetic head in which ends on one side of opposed first and second magnetic cores form a recording gap, said other ends form a magnetic joint, coils insulated by an insulating material are provided between said first and second magnetic cores, magnetic fluxes of said first and second magnetic cores excited by said coils leak from said recording gap so that recording onto a recording medium is carried out. In said recording head, a distance from said end of said recording gap close to said magnetic medium to a contact point of said magnetic joint (hereinafter, yoke length) is not more than 20 μm. A magnetic recording/reproduction apparatus has this head.

12 Claims, 21 Drawing Sheets

U.S. PATENT DOCUMENTS

| | | |
|---|---|---|
| 6,266,216 B1 | 7/2001 | Hikami et al. |
| 6,513,228 B1 | 2/2003 | Khizroev et al. |
| 6,525,903 B1 | 2/2003 | Sasaki |
| 6,597,543 B1 | 7/2003 | Saitho et al. |
| 6,687,082 B1 * | 2/2004 | Ishiwata et al. ............ 360/126 |
| 6,791,794 B2 * | 9/2004 | Honjo et al. ................ 360/126 |
| 6,989,964 B2 * | 1/2006 | Hsu et al. ................... 360/126 |

FOREIGN PATENT DOCUMENTS

| | | |
|---|---|---|
| JP | S63-117307 A | 5/1988 |
| JP | H01-109507 A | 4/1989 |
| JP | H01-223612 A | 9/1989 |
| JP | H05-073839 A | 3/1993 |
| JP | 6-195637 | 7/1994 |
| JP | H06-267776 A | 9/1994 |
| JP | 6-346202 | 12/1994 |
| JP | 7-3489 | 1/1995 |
| JP | H07-57217 A | 3/1995 |
| JP | H07-220234 A | 8/1995 |
| JP | 7-262519 | 10/1995 |
| JP | 8-212512 | 8/1996 |
| JP | 9-147320 | 6/1997 |
| JP | H09-237407 A | 9/1997 |
| JP | H10-143820 A | 5/1998 |
| JP | 10-162322 | 6/1998 |
| JP | H10-199726 A | 7/1998 |
| JP | 2821456 | 8/1998 |
| JP | 63-53277 | 10/1998 |
| JP | 11-16120 | 1/1999 |
| JP | 11-74122 | 3/1999 |
| JP | 11-86227 | 3/1999 |
| JP | 11-120522 | 4/1999 |
| JP | 11-149623 | 6/1999 |
| JP | H11-203627 A | 7/1999 |
| JP | H11-283216 A | 10/1999 |
| JP | 2000-268321 A | 9/2000 |
| JP | 2001-110009 A | 4/2001 |

OTHER PUBLICATIONS

C. Tsang et al., "Design, Fabrication & Testing of Spin-Value Read Heads for High Density Recording", IEEE Transactions on Magnetics, vol. 30, No. 6, Nov. 1994, pp. 3801-3806 with Abstract.

C. Tsang et al., "3 Gb/in$^2$ Recordaing Demonstration with Dual Element Heads & Thin Film Disks", IEEE Transactions on Magnetics, vol. 32, No. 1, Jan. 1996, pp. 7-12 with Abstract.

C. Tsang et al., 5 Gb/in$^2$ Recording Demonstration with Conventional AMR Dual Element Heads & Thin Film Disks, IEEE Transactions on Magnetics, vol. 33, No. 5, Sep. 1997, pp. 2866-2871 with Abstract.

* cited by examiner

Fig. 35

Table 1-1

| Embodiments of the present invention | yoke length | Magnetic core 11(11a/11b) | | | | | Magnetic core 6(6a/6b) | | | | | | output fluctuation (%) | 30% Roll-off frequency o/w (MHz) | O/N (dB) | judgment |
|---|---|---|---|---|---|---|---|---|---|---|---|---|---|---|---|---|
| | | Composition | Method | Saturation magnetization (T) | Magneto-striction (×10⁻⁶) | Specific resistance (μΩcm) | Film thickness (μm) | Composition | Method | Saturation magnetization (T) | Magneto-striction (×10⁻⁶) | specific resistance (μΩcm) | Film thickness (μm) | | | | |
| 1 | 9.5 | 67Co10Ni23Fe | Plating | 2 | 2 | 19 | 1 | 6a:67Co10Ni23Fe 6b:82Ni18Fe | Plating Plating | 2 1 | 2 -1 | 19 20 | 0.5 2 | 0.2 | 350 | 44 | ◎ |
| 1 | 9.5 | 67Co10Ni23Fe | Plating | 2 | 2 | 19 | 1 | 6a:67Co10Ni23Fe 6b:82Ni18Fe | Plating Plating | 2 1 | 2 -1 | 19 20 | 0.5 1 | 0.4 | 380 | 42 | ◎ |
| 1 | 9.5 | 67Co8Ni25Fe | Plating | 2.1 | 5 | 18 | 1 | 6a:67Co8Ni25Fe 6b:82Ni18Fe | Plating Plating | 2.1 1 | 5 -1 | 18 20 | 0.5 2 | 0.4 | 345 | 46 | ◎ |
| 1 | 9.5 | 65Co14Ni21Fe | Plating | 1.9 | 0.5 | 20 | 1 | 6a:65Co10Ni21Fe 6b:82Ni18Fe | Plating Plating | 1.9 1 | 0.5 -1 | 20 20 | 0.5 2 | 0.2 | 340 | 42 | ◎ |
| 1 | 9.5 | 45Ni55Fe | Plating | 1.6 | 15 | 40 | 1.5 | 6a:45Ni55Fe 6b:82Ni18Fe | Plating Plating | 1.8 1 | 15 -1 | 40 20 | 0.5 2 | 0.9 | 380 | 33 | ○ |
| 1 | 9.5 | 67Co10Ni23Fe | Plating | 2 | 2 | 19 | 0.7 | 6a:67Co10Ni23Fe 6b:82Ni18Fe | Plating Plating | 2 1 | 2 -1 | 19 20 | 0.5 2 | 0.2 | 370 | 38 | ◎ |
| 1 | 9.5 | 97.3Fe2.7N | Sputtering | 2 | 2 | 50 | 1 | 6a:97.3Fe2.7N 6b:82Ni18Fe | Sputtering Plating | 2 1 | 2 -1 | 50 20 | 0.5 2 | 0.3 | 380 | 43 | ◎ |
| 1 | 19 | 67Co10Ni23Fe | Plating | 2 | 2 | 19 | 1.5 | 6a:67Co10Ni23Fe 6b:82Ni18Fe | Plating Plating | 2 1 | 2 -1 | 19 20 | 0.5 2 | 0.6 | 120 | 45 | ○ |
| 1 | 19 | 67Co10Ni23Fe | Plating | 2 | 2 | 19 | 1.5 | 6a:67Co10Ni23Fe 6b:82Ni18Fe | Plating Plating | 2 1 | 2 -1 | 19 20 | 0.5 1 | 0.7 | 140 | 42 | ○ |
| 1 | 19 | 45Ni55Fe | Plating | 1.6 | 15 | 40 | 2 | 6a:45NiFe 6b:82Ni18Fe | Plating Plating | 1.6 1 | 15 -1 | 40 20 | 0.5 2 | 0.8 | 150 | 32 | ○ |
| 1 | 19 | 67Co10Ni23Fe | Plating | 2 | 2 | 19 | 1 | 6a:67Co10Ni23Fe 6b:82Ni18Fe | Plating Plating | 2 1 | 2 -1 | 19 20 | 0.5 2 | 0.6 | 140 | 38 | ◎ |
| 1 | 9.5 | 66Co15Ni19Fe | Plating | 1.7 | 0.1 | 20 | 1 | 6a:66Co15Ni19Fe 6b:82Ni18Fe | Plating Plating | 1.7 1 | 0.1 -1 | 19 20 | 0.5 2 | 0.2 | 355 | 39 | ◎ |
| 1 | 9.5 | 67Co16Ni17Fe | Plating | 1.6 | -0.5 | 21 | 1 | 6a:66Co15Ni19Fe 6b:82Ni18Fe | Plating Plating | 1.6 1 | -0.5 -1 | 21 20 | 0.5 2 | 0.2 | 350 | 35 | ○ |

Fig.36

Table 1-2

| Embodiments of the present invention | yoke length | Magnetic core 11 (11a/11b) | | | | | | Magnetic core 6 (6a/6b) | | | | | | output fluctuation (%) | 30% Roll-off frequency o/w (MHz) | O/W (dB) | judgment |
|---|---|---|---|---|---|---|---|---|---|---|---|---|---|---|---|---|---|
| | | Composition | Method | Saturation magnetization (T) | Magnetostriction (×10⁻⁶) | Specific resistance (μΩcm) | Film thickness (μm) | Composition | Method | Saturation magnetization (T) | Magnetostriction (×10⁻⁶) | Specific resistance (μΩcm) | Film thickness (μm) | | | | |
| Comparative example 1 | 23 | 67Co10Ni23Fe | Plating | 2 | 2 | 19 | 1 | 6a:67Co10Ni23Fe / 6b:82Ni18Fe | Plating / Plating | 2 / 1 | 2 / -1 | 19 / 20 | 19 / 20 | 1.4 | 71 | 43 | × |
| Comparative example 2 | 9.5 | 67Co10Ni23Fe | Plating | 2 | 2 | 19 | 0.3 | 6a:67Co10Ni23Fe / 6b:82Ni18Fe | Plating / Plating | 2 / 1 | 2 / -1 | 19 / 20 | 19 / 20 | 0.2 | 390 | 23 | × |
| Comparative example 3 | 19 | 67Co10Ni23Fe | Plating | 2 | 2 | 19 | 0.5 | 6a:67Co10Ni23Fe / 6b:82Ni18Fe | Plating / Plating | 2 / 1 | 2 / -1 | 19 / 20 | 19 / 20 | 0.6 | 160 | 22 | × |
| Comparative example 4 | 23 | 11a:67Co10Ni23Fe / 11b:82Ni18Fe | Plating / Plating | 2 / 1 | 2 / -1 | 19 / 20 | 0.5 / 2 | 6a:67Co10Ni23Fe / 6b:82Ni18Fe | Plating / Plating | 2 / 1 | 2 / -1 | 19 / 20 | 19 / 20 | 1.3 | 70 | 42 | × |
| Comparative example 5 | 23 | 11a:67Co8Ni25Fe / 11b:82Ni18Fe | Plating / Plating | 2.1 / 1 | 5 / -1 | 18 / 20 | 0.5 / 2 | 6a:67Co8Ni25Fe / 6b:82Ni18Fe | Plating / Plating | 2.1 / 1 | 5 / -1 | 18 / 20 | 18 / 20 | 1.5 | 68 | 44 | × |
| Comparative example 6 | 23 | 11a:65Co14Ni21Fe / 11b:82Ni18Fe | Plating / Plating | 1.9 / 1 | 0.5 / -1 | 20 / 20 | 0.5 / 2 | 6a:65Co14Ni21Fe / 6b:82Ni18Fe | Plating / Plating | 1.9 / 1 | 0.5 / -1 | 20 / 20 | 20 / 20 | 0.9 | 72 | 41 | × |
| Comparative example 7 | 23 | 11a:45Ni55Fe / 11b:82Ni18Fe | Plating / Plating | 1.6 / 1 | 15 / -1 | 40 / 20 | 0.5 / 2 | 6a:45Ni55Fe / 6b:82Ni18Fe | Plating / Plating | 1.6 / 1 | 2 / -1 | 19 / 20 | 19 / 20 | 2.2 | 80 | 32 | × |
| Comparative example 8 | 44 | 11a:67Co10Ni23Fe / 11b:82Ni18Fe | Plating / Plating | 2 / 1 | 2 / -1 | 19 / 20 | 0.5 / 3 | 6a:67Co10Ni23Fe / 6b:82Ni18Fe | Plating / Plating | 2 / 1 | 2 / -1 | 19 / 20 | 19 / 20 | 2.8 | 35 | 44 | × |
| Comparative example 9 | 44 | 11a:67Co8Ni25Fe / 11b:82Ni18Fe | Plating / Plating | 2.1 / 1 | 5 / -1 | 18 / 20 | 0.5 / 3 | 6a:67Co8Ni25Fe / 6b:82Ni18Fe | Plating / Plating | 2.1 / 1 | 5 / -1 | 18 / 20 | 18 / 20 | 3.1 | 32 | 45 | × |
| Comparative example 10 | 44 | 11a:65Co14Ni21Fe / 11b:82Ni18Fe | Plating / Plating | 1.9 / 1 | 0.5 / -1 | 20 / 20 | 0.5 / 3 | 6a:65Co14Ni21Fe / 6b:82Ni18Fe | Plating / Plating | 1.9 / 1 | 0.5 / -1 | 20 / 20 | 20 / 20 | 1.5 | 36 | 41 | × |
| Comparative example 11 | 44 | 11a:97.3Fe2.7N / 11b:82Ni18Fe | Sputtering / Plating | 2 / 1 | 2 / -1 | 50 / 20 | 0.5 / 3 | 6a:97.3Fe2.7N / 6b:82Ni18Fe | Sputtering / Plating | 2 / 1 | 2 / -1 | 50 / 20 | 50 / 20 | 2.7 | 40 | 42 | × |
| Comparative example 12 | 75 | 11a:67Co10Ni23Fe / 11b:82Ni18Fe | Plating / Plating | 2 / 1 | 2 / -1 | 19 / 20 | 0.5 / 3.5 | 6a:67Co10Ni23Fe / 6b:82Ni18Fe | Plating / Plating | 2 / 1 | 2 / -1 | 19 / 20 | 19 / 20 | 4.9 | 15 | 42 | × |
| Comparative example 13 | 75 | 11a:67Co8Ni25Fe / 11b:82Ni18Fe | Plating / Plating | 2.1 / 1 | 5 / -1 | 18 / 20 | 0.5 / 3.5 | 6a:67Co8Ni25Fe / 6b:82Ni18Fe | Plating / Plating | 2.1 / 1 | 5 / -1 | 18 / 20 | 18 / 20 | 5.5 | 13 | 43 | × |
| Comparative example 14 | 75 | 11a:65Co14Ni21Fe / 11b:82Ni18Fe | Plating / Plating | 1.9 / 1 | 0.5 / -1 | 20 / 20 | 0.5 / 3.5 | 6a:65Co14Ni21Fe / 6b:82Ni18Fe | Plating / Plating | 1.9 / 1 | -0.5 / -1 | 20 / 20 | 20 / 20 | 2.7 | 17 | 40 | × |

Table 2-1

Fig. 37

| Embodiments of the present invention | yoke length | Magnetic core 11(11a/11b) | | | | | |
|---|---|---|---|---|---|---|---|
| | | Composition | Method | Saturation magnetization (T) | Magnetostriction ($\times 10^{-6}$) | Specific resistance ($\mu\Omega$cm) | Film thickness ($\mu$m) |
| 2 | 9.5 | 11a:67Co10Ni23Fe | Plating | 2 | 2 | 19 | 0.5 |
| | | 11b:82Ni18Fe | Plating | 1 | -1 | 20 | 1 |
| 2 | 9.5 | 11a:67Co8Ni25Fe | Plating | 2.1 | 5 | 18 | 0.5 |
| | | 11b:82Ni18Fe | Plating | 1 | -1 | 20 | 1 |
| 2 | 9.5 | 11a:65Co14Ni21Fe | Plating | 1.9 | 0.5 | 20 | 0.5 |
| | | 11b:82Ni18Fe | Plating | 1 | -1 | 20 | 1 |
| 2 | 9.5 | 11a:67Co10Ni23Fe | Plating | 2 | 2 | 19 | 0.5 |
| | | 11b:82Ni18Fe | Plating | 1 | -1 | 20 | 1 |
| 2 | 9.5 | 11a:45Ni55Fe | Plating | 1.6 | 2 | 19 | 0.5 |
| | | 11b:82Ni18Fe | Plating | 1 | -1 | 20 | 1.5 |
| 2 | 9.5 | 11a:97.3Fe2.7N | Sputtering | 2 | 2 | 50 | 0.5 |
| | | 11b:82Ni18Fe | Plating | 1 | -1 | 20 | 1.5 |
| 2 | 19 | 11a:67Co10Ni23Fe | Plating | 2 | 2 | 19 | 0.5 |
| | | 11b:82Ni18Fe | Plating | 1 | -1 | 20 | 1 |
| 2 | 19 | 11a:67Co10Ni23Fe | Plating | 2 | 2 | 19 | 0.5 |
| | | 11b:82Ni18Fe | Plating | 1 | -1 | 20 | 1 |
| 2 | 19 | 11a:45Ni55Fe | Plating | 1.6 | 15 | 40 | 0.5 |
| | | 11b:82Ni18Fe | Plating | 1 | -1 | 20 | 1.5 |
| 3 | 9.5 | 11a:67Co10Ni23Fe | Plating | 2 | 2 | 19 | 0.5 |
| | | 11b:82Ni18Fe | Plating | 1 | -1 | 20 | 1 |
| 3 | 9.5 | 11a:67Co8Ni25Fe | Plating | 2.1 | 5 | 18 | 0.5 |
| | | 11b:82Ni18Fe | Plating | 1 | -1 | 20 | 1 |
| 3 | 9.5 | 11a:65Co14Ni21Fe | Plating | 1.9 | 0.5 | 20 | 0.5 |
| | | 11b:82Ni18Fe | Plating | 1 | -1 | 20 | 1 |
| 3 | 9.5 | 11a:67Co10Ni23Fe | Plating | 2 | 2 | 19 | 0.5 |
| | | 11b:82Ni18Fe | Plating | 1 | -1 | 20 | 1 |
| 3 | 9.5 | 11a:45Ni55Fe | Plating | 1.6 | 15 | 40 | 0.5 |
| | | 11b:82Ni18Fe | Plating | 1 | -1 | 20 | 1.5 |
| 3 | 9.5 | 11a:97.3Fe2.7N | Sputtering | 2 | 2 | 50 | 0.5 |
| | | 11b:82Ni18Fe | Plating | 1 | -1 | 20 | 1.5 |
| 4 | 9.5 | 67Co10Ni23Fe | Plating | 2 | 2 | 19 | 1 |
| 4 | 9.5 | 67Co10Ni23Fe | Plating | 2 | 2 | 19 | 1 |
| 4 | 9.5 | 45Ni55Fe | Plating | 1.6 | 15 | 40 | 1.5 |
| 4 | 9.5 | 97.3Fe2.7N | Sputtering | 2 | 2 | 50 | 1 |

Fig. 38

Table 2-2

| Composition | Method | Magnetic core 6(6a/6b) Saturation magnetization (T) | Magneto-striction (×10⁻⁶) | Specific resistance (μΩcm) | Film thickness (μm) | output fluctuation (%) | 30% Roll-off frequency o/w (MHz) | O/W (dB) | judgment |
|---|---|---|---|---|---|---|---|---|---|
| 6a:67Co10Ni23Fe<br>6b:82Ni18Fe | Plating<br>Plating | 2<br>1 | 2<br>-1 | 19<br>20 | 0.5<br>2 | 0.3 | 350 | 42 | ◎ |
| 6a:67Co8Ni25Fe<br>6b:82Ni18Fe | Plating<br>Plating | 2.1<br>1 | 5<br>-1 | 18<br>20 | 0.5<br>2 | 0.5 | 345 | 45 | ◎ |
| 6a:65Co14Ni21Fe<br>6b:82Ni18Fe | Plating<br>Plating | 1.9<br>1 | 0.5<br>-1 | 20<br>20 | 0.5<br>2 | 0.5 | 355 | 41 | ◎ |
| 6a:67Co10Ni23Fe<br>6b:82Ni18Fe | Plating<br>Plating | 2<br>1 | 2<br>-1 | 19<br>20 | 0.5<br>1 | 0.3 | 380 | 40 | ◎ |
| 6a:45Ni55Fe<br>6b:82Ni18Fe | Plating<br>Plating | 1.6<br>1 | 2<br>-1 | 19<br>20 | 0.5<br>2 | 0.8 | 370 | 33 | ○ |
| 6a:97.3Fe2.7N<br>6b:82Ni18Fe | Sputtering<br>Plating | 2<br>1 | 2<br>-1 | 50<br>20 | 0.5<br>2 | 0.3 | 380 | 42 | ◎ |
| 6a:67Co10Ni23Fe<br>6b:82Ni18Fe | Plating<br>Plating | 2<br>1 | 2<br>-1 | 19<br>20 | 0.5<br>2 | 0.5 | 130 | 43 | ◎ |
| 6a:67Co10Ni23Fe<br>6b:82Ni18Fe | Plating<br>Plating | 2<br>1 | 2<br>-1 | 19<br>20 | 0.5<br>1 | 0.7 | 160 | 41 | ◎ |
| 6a:45Ni55Fe<br>6b:82Ni18Fe | Plating<br>Plating | 1.6<br>1 | 15<br>-1 | 40<br>20 | 0.5<br>2 | 0.9 | 150 | 32 | ○ |
| 67Co10Ni23Fe | Plating | 2 | 2 | 19 | 1 | 0.6 | 360 | 43 | ◎ |
| 67Co8Ni25Fe | Plating | 2.1 | 5 | 18 | 1 | 0.8 | 350 | 45 | ◎ |
| 65Co14Ni21Fe | Plating | 1.9 | 3.5 | 20 | 1 | 0.5 | 365 | 42 | ◎ |
| 82Ni18Fe | Plating | 1 | -1 | 20 | 2 | 0.3 | 350 | 39 | ◎ |
| 82Ni18Fe | Plating | 1 | -1 | 20 | 2 | 0.3 | 370 | 32 | ○ |
| 97.3FE i2.7N | Sputtering | 2 | 2 | 50 | 2 | 0.5 | 380 | 44 | ◎ |
| 67Co10Ni23Fe | Plating | 2 | 2 | 19 | 1 | 0.5 | 370 | 47 | ◎ |
| 82Ni18Fe | Plating | 1 | -1 | 20 | 2 | 0.4 | 350 | 41 | ◎ |
| 82Ni18Fe | Plating | 1 | -1 | 20 | 2 | 0.4 | 380 | 32 | ○ |
| 97.3Fe2.7N | Sputtering | 2 | 2 | 50 | 2 | 0.5 | 385 | 44 | ◎ |

Fig. 39

Table 3

| Embodiments of the present invention | yoke length | magnetic core 1f (11a/11b) | | | | | | Magnetic core 6 (6a/6b) | | | | | | output fluctuation (%) | 30% Roll-off frequency o/* (MHz) | O/W (dB) | judgment |
|---|---|---|---|---|---|---|---|---|---|---|---|---|---|---|---|---|---|
| | | Composition | Method | Saturation magnetization (T) | Magneto-striction ($\times 10^{-6}$) | specific resistance ($\mu\Omega$cm) | Film thickness ($\mu$m) | Composition | Method | Saturation magnetization (T) | Magneto-striction ($\times 10^{-6}$) | Specific resistance ($\mu\Omega$cm) | Film thickness ($\mu$m) | | | | |
| 5 | 5 | 67Co10Ni23Fe | Plating | 2 | 2 | 19 | 1 | 6a:67Co10Ni23Fe  6b:82Ni18Fe | Plating Plating | 2 1 | 2 -1 | 19 20 | 0.5 2 | 0.2 | 620 | 44 | ◎ |
| 5 | 5 | 67Co10Ni23Fe | Plating | 2 | 2 | 19 | 1 | 6a:67Co10Ni23Fe  6b:82Ni18Fe | Plating Plating | 2 1 | 2 -1 | 19 20 | 0.5 1 | 0.5 | 640 | 42 | ◎ |
| 5 | 5 | 67Co8Ni25Fe | Plating | 2.1 | 3.5 | 18 | 1 | 6a:67Co8Ni25Fe  6b:82Ni18Fe | Plating Plating | 2.1 1 | 3.5 -1 | 18 20 | 0.5 2 | 0.6 | 610 | 46 | ◎ |
| 5 | 5 | 65Co14Ni21Fe | Plating | 1.9 | 0.5 | 20 | 1 | 6a:65Co14Ni21Fe  6b:82Ni18Fe | Plating Plating | 1.9 1 | 0.5 -1 | 20 20 | 0.5 2 | 0.2 | 630 | 42 | ◎ |
| 5 | 5 | 45Ni55Fe | Plating | 1.6 | 15 | 40 | 1.5 | 6a:45Ni55Fe  6b:82Ni18Fe | Plating Plating | 1.6 1 | 15 -1 | 40 20 | 0.5 2 | 0.9 | 650 | 32 | ○ |
| 5 | 5 | 67Co10Ni23Fe | Plating | 2 | 2 | 19 | 0.5 | 6a:67Co10Ni23Fe  6b:82Ni18Fe | Plating Plating | 2 1 | 2 -1 | 19 20 | 0.5 2 | 0.2 | 660 | 38 | ◎ |
| 5 | 5 | 97.3Fe2.7N | Sputtering | 2 | 2 | 50 | 1 | 6a:97.3Fe2.7N  6b:82Ni18Fe | Sputtering Plating | 2 1 | 2 -1 | 50 20 | 0.5 2 | 0.3 | 655 | 43 | ◎ |
| Comparative example | 5 | 67Co10Ni23Fe | Plating | 2 | 2 | 19 | 0.25 | 6a:67Co10Ni23Fe  6b:82Ni18Fe | Plating Plating | 2 1 | 2 -1 | 19 20 | 0.5 2 | 0.2 | 660 | 20 | × |

RECORDING HEAD, RECORDING HEAD MANUFACTURING METHOD, COMBINED HEAD AND MAGNETIC RECORDING/REPRODUCTION APPARATUS

This is a divisional of application Ser. No. 09/748,214 filed Dec. 27, 2000 now U.S. Pat. No. 6,795,271 the disclosure of which is incorporated herein by reference.

BACKGROUND OF THE INVENTION

1. Field of the Invention

The present invention relates to a magnetic head for a magnetic recording/reproduction apparatus and a magnetic recording/reproduction apparatus, and more specifically to a recording head, a combined head and a magnetic recording/reproduction apparatus in which a fluctuation in reproduction characteristics is suppressed even in the case where a material having great saturation magnetization which realizes high recording ability is used for a magnetic core.

2. Description of the Related Art

In accordance with a trend of minimization and enlarging capacity of a magnetic memory device, a volume of per one bit to be recorded on a magnetic medium becomes smaller quickly.

A magnetoresistive effect type head (hereinafter, "MR head") can detect a magnetic signal generated from this minute bit as a large reproduction output.

This MR head is discussed as "A Magnetoresistivity Readout Transducer" in "IEEETrans. on Magn,. MAG7 (1971) 150".

Recently, a great magnetoresistive (hereinafter, "GMR") head using GMR which can realize greatly high output for the MR head has been put into practical use.

In this GMR effect, particularly a magnetoresistive effect which is generally called as a spin-valve effect, in-which a change in resistance corresponds to cosine between magnetization directions of two adjacent magnetic layers, shows a great change in resistance in a weak operating magnetic field. For this reason, the GMR head using this effect is a generic name of "GMR head".

This GMR head using the spin-valve effect is discussed as "Design, Fabrication & Testing of Spin-Valve Read Heads for High Density Recording" in "IEEE Trans. on Magn,. Vol. 30, No. 6 (1994)3801".

As for the above GMR head, one magnetic layer of two magnetic layers for producing the spin-valve effect has a magnetization fixed layer where magnetization is fixed so as to be substantially aligned with a direction along which a magnetic field of a medium entering into a head magnetic sensing portion by an exchange coupling magnetic field which is generated by laminating an antiferromagnetic film on the one magnetic layer.

The other magnetic film, which is adjacent to the magnetization fixed layer via a conductive layer made of Cu or the like, is a magnetization free layer in which the magnetization direction can be changed freely with respect to the magnetic filed of the medium. Hereinafter, the GMR head using the spin-valve effect is called as "GMR head".

FIGS. 6 and 7 are structural diagrams showing concrete examples of a conventional combined head 50 which is composed of a GMR reproduction head 70 and an ID recording head 60. FIG. 7 is a diagram of the structure of the GMR head viewed from an air bearing surface (ABS surface) which is a surface opposed to the magnetic medium. FIG. 6 is a cross section taken along a line A–B of FIG. 7.

Namely, a magnetic separation layer 3 made of an insulating material intervenes between a lower shield 2 and an upper shield 6 which are laminated on a ceramic 1 to be used as a slider, and a spin-valve laminated structure for producing the GMR effect is arranged as a center area 4. An end portion area 5 for supplying an electric current and a bias magnetic field is formed at both the ends of the center area 4. These are GMR elements for reproduction.

Further, the upper shield is used as a first magnetic core 6, and a second magnetic core 11 is arranged on a surface of the magnetic core 6 which is opposite to the GMR elements via a recording gap 7.

Coils 9, which are sandwiched between the recording gap film 7, a non-magnetic insulating material 10a and a non-magnetic insulating material 10b, are arranged in slightly inner portions of the magnetic cores 6 and 11 from ABS.

Recording is carried out by magnetic flux which leaks from the recording gap 7 between the magnetic cores 6 and 11 magnetized by magnetic fields generated from the coils.

The above combined-structure head, in which the GMR or MR reproduction head and the inductive (hereinafter "ID") recording head are stacked to each other, is called as a combined head here.

A recording density which is actually used by the combined head using GMR has a high-density recording area of not less than 3 GB per inch. A conventional combined head using a material having magnetic anisotropy is sufficient for recording density less than the above density.

Namely, the practical combined head using GMR realizes magnetic recording/reproduction with high density of not less than 3 GB per 1 square inch.

In the reverse way, a magnetic recording/reproduction apparatus which is structured by using the combined head of GMR is an apparatus for carrying out recording/reproduction with high density of 3 GB per 1 square inch.

An ID head which takes responsibility for recording onto a magnetic medium is always required for improvement of a high-density recording. Particularly, a high coercive force of a magnetic medium is essential for high-density recording.

This is because a magnetization transition length to be recorded on a medium is made to be shorter in accordance with the improvement of the recording density, or the magnetization is kept constant even if a magnetization length for 1 bit becomes shorter.

For this reason, a technique for increasing a recording magnetic field has been conventionally developed energetically so that recording can be carried out onto high coercive force medium as an ID head which is suitable for high-density recording.

Conventionally, an Ni—Fe plated film (hereinafter, permalloy) in which Ni is about 80 weight % has been used as a magnetic core of the ID head. This material has saturation magnetization (Bs) of about 1 T (tesla), and recording of 3 GB per 1 square inch can be carried out. This is described in "3 Gb/in$^2$ recording demonstration with dual element heads & thin film disks" of "IEEE Trans. on Magn,. Vol. 32, No. 1 (1996) pp. 7–12".

However, in order to carry out recording of not less than 5 GB per 1 square inch, an Ni—Fe plated film in which Ni is about 45 weight % (hereinafter, 45NiFe) is required instead of the permalloy. This is described in "5 Gb/in$^2$ recording demonstration with conventional ARM dual element heads & thin film disks" of "IEEEE Trans. on Magn,. Vol. 33, No. 5 (1997) pp. 2866–2871".

This material has saturation magnetization of about 1.6 T (tesla) maximally. Moreover, with this material, recording of about 12 GB per 1 square inch can be carried out. This is described in "12 Gb/in² recording demonstration with SV read heads & conventional narrow pole-tipwrite"of "IEEE Trans. on Magn,. Vol. 32, No. 1 (1996) pp. 7–12".

Meanwhile, examples using an Ni—Fe plated film in which Bs is about 1.6 are disclosed in the Japanese Unexamined Patent Publication (KOKAI) Nos. 8-212512 (1996) and 11-16120 (1999).

In addition, an example using a high saturation magnetization Bs material formed by a sputtering method is disclosed in the Japanese Unexamined Patent Publication (KOKAI) No. 10-162322 (1998), and in this example, a Co amorphous film represented by a Co—Ta—Zr sputtering film is used.

The Co amorphous film can have high Bs up to about 1.5 T. Moreover, the Japanese Unexamined Patent Publication (KOKAI) No. 7-262519 (1995) discloses an application of high Bs materials such as ferric nitride. It is considered that an iron-nitrogen material can have high Bs of about 1.9 T.

Further, in the case where simplicity and cost reduction of a manufacturing process for a magnetic head are considered, it is effective to form a magnetic material forming a recording magnetic pole according to a z plating method.

In the plating method, a photoresist frame through which a form of a magnetic pole previously pierces is formed, and a plated film is allowed to grow in the frame so that a desired pattern can be obtained. Because of the simplicity and cost reduction of this method, this method is currently a standard manufacturing method of a thin film magnetic head.

Meanwhile, in the case where a magnetic core pattern is formed by the sputtering method, a photoresist mask is formed on a magnetic film previously formed into a core shape, and the core pattern is formed by etching using an ion beam.

In this method, first, an expensive ion beam etching apparatus is required, and second, a long processing time is required for patterning a thick magnetic core film of several μm, and third, it is very difficult to form magnetic core end portions with narrow width which determine a recording width on a medium.

Particularly, as shown in FIG. 6, it is very difficult to pattern the upper core 11 under a condition that there exists a great level difference between the coils and their upper and lower insulating layers.

The Japanese Unexamined Patent Publication (KOKAI) No. 7-262519 (1995) discloses a method of forming only magnetic core end portions before forming a great level difference between coils and insulating layers and introducing an ion-nitrogen sputtering film into the magnetic core end portions. However, this is originally a method using ion beam etching and is not a low-priced manufacturing method.

As mentioned above, when the sputtering film is applied to the magnetic core, a rise of the cost due to complication of the manufacturing method is inevitable.

In addition, in accordance with improvement of the recording density, it is considered that a high Bs film with more than 1.5 T obtained by 45Ni—Fe is indispensable. It is very important to realize the high Bs film according to the low-priced plating method. Co—Fe—Ni is promising as a material of a plated film which realize high Bs of more than 1.5 T.

Further, in a composition diagram of three elements in FIG. 1 of the Japanese Examined Patent Publication (KOKOKU) No. 63-53277 (1988), a line of magnetostriction $\lambda s=0$ in a Co—Fe—Ni plated film is shown, and in a composition diagram of three elements in FIG. 2 of this publication, Bs in the Co—Fe—Ni plated film is shown.

According to this diagrams, Bs around 80Co10Fe10Ni where λs become substantially zero is about 1.6 T.

Meanwhile, in the Japanese Unexamined Patent Publication (KOKAI) No. 6 -346202 (1994), crystallizability of the Co—Fe—Ni plated film is adjusted so that both low-magnetostriction and high Bs, which cannot be realized in Japanese Examined Patent Publication (KOKOKU) No. 63-53277 (1988), are compatible with each other.

As a result, a Co—Fe—Ni plated film in which Bs is about 1.7 T when $\lambda s<5\times10^{-6}$, is obtained.

In addition, the Japanese Unexamined Patent Publication (KOKAI) No. 7-3489 (1995) describes that a low coercive force is obtained by adjusting crystallizability and Bs which falls within a range of 1.3 to 2 T is obtained.

Further, in Publication of Japanese Patent No. 2821456, a Co—Ni—Fe plated film is deposited in a bath without an additive containing S such as saccharin, and the high-purity film, in which sulfur concentration in the film is suppressed to not more than 0.1 weight %, is obtained.

As a result, a mixed crystal composition of fcc and bcc transfers to an area with many Fe compositions, and the magnetostriction is lowered to a practical level in this composition, and extremely high Bs of 1.9 T to 2.2 T as well as satisfactory soft magnetic characteristic in which a coercive force is not more than 2.50 e are realized.

As mentioned above, the Co—Ni—Fe plated film can realize the practical soft magnetic characteristic as a magnetic core material of ID head by controlling crystallizability and content of mixture into the film. As disclosed in Patent No. 2821456, Bs can be extremely large and satisfactory soft magnetic can be realized.

As mentioned above, the Co—Ni—Fe film or 45NiFe film, which is formed by the plating method and has great saturation magnetization, is very preferable for a recording core material for achieving high-density magnetic recording. However, since these films have the following properties, there have conventionally arose various problems due to these properties.

Namely, the first problem is that the magnetostriction of the Co—Ni—Fe film or 45NiFe film with high Bs is positive.

For example, in the case where the 45Ni—Fe film is applied to an upper shield of a GMR reproduction head which also serves as a recording core, a fluctuation in a reproduced output after recording operation is very conspicuous, and thus it becomes a combined head which cannot be practically used.

This is because as the magnetostriction is positive, a magnetization state of the upper shield after recording operation is hardly stabilized, and a reproduction characteristic is adversely affected therefrom.

Therefore, the 45NiFe cannot be applied to the upper shield which also serves as the magnetic core for recording.

For this reason, the 45NiFe with great saturation magnetization can be applied only to the upper core, and since normal permalloy is applied to the upper shield, the recording ability itself is limited.

In addition, as for the Co—Ni—Fe film, its magnetostriction is controlled so as to be changed from positive to negative by controlling a composition, but the magnetostriction is positive in the composition where the saturation magnetization is great, namely, not less than 1.7 T. Accordingly, the problem which is the same as that of the 45NiFe arises.

Further, in the case of the permalloy which has been conventionally used for the upper shields, since the magnetostriction of the permalloy film is controlled by a film composition, it is necessary to strictly control the composition so that the magnetostriction suitable for the upper shield is obtained. This causes a rise of the manufacturing cost.

In addition, the second problem is that a stress is strong particularly in a Co—Ni—Fe film whereby the saturation magnetization is great, namely, about 2 T.

The stress is about 0.8 GPa, and when a thick film of not less than 2 μm is intended to be formed, peeling of the film is conspicuous.

As a result, when the whole upper magnetic core is intended to be formed by a Co—Ni—Fe film which shows great saturation magnetization, the film thickness of not less than 2 μm is required, and thus the manufacturing is difficult.

As a method of applying the Co—Ni—Fe film to the upper magnetic core, a method of forming a Co—Ni—Fe film having a thickness of 0.5 μm in a vicinity of a recording gap and laminating a permalloy having a thickness of about 3.5 μm has been used.

Also with this method, the effect of the material with high saturation magnetization is successfully brought out, but in order to bring out the effect maximally it is desirable to form the whole core using a Co—Ni—Fe film.

Further, the third problem is that as the recording density is improved, the recording head requires an operation with higher frequency. Particularly in a Co—Ni—Fe film where saturation magnetization is large, namely, about 2 T, since a specific resistance is small, namely, about 20μΩcm, an overcurrent loss in high-frequency operation increases, and the recording characteristic is easily deteriorated.

SUMMARY OF THE INVENTION

Therefore, a main object of the present invention is to provide a recording head and a combined head in which the above disadvantages of the conventional techniques are resolved and a fluctuation in reproduction characteristic is suppressed even in the case where a Co—Ni—Fe film or a 45NiFe film with great saturation magnetization for realizing high recording ability is applied to an upper shield of a combined head.

In addition, a second object of the present invention is to provide a recording head in which its high saturation magnetization characteristic can be applied maximally as recording characteristic by using a magnetic core material with great saturation magnetization such as a Co—Ni—Fe film or an Ni—Fe alloy film which particularly 1.5 and more saturation magnetization can be obtained.

In addition, a third object of the present invention is to provide a recording head in which its recording performance is high at high frequency.

Further, a fourth aspect of the present invention is to provide methods of manufacturing the above recording head and combined head. This object is particularly to provide a method of manufacturing a magnetic core which enables narrow-width recording according to high-density recording which is realized by applying the recording head of the present invention.

Further, a fifth object of the present invention is to provide a magnetic recording/reproduction apparatus provided with the above recording head and combined head.

In order to achieve the above objects, the present invention basically adopts the following technical structures.

Namely, a first aspect of the present invention is a recording head including a magnetic head comprising a first magnetic core and a second magnetic core, each being oppositely arranged to each other, one of ends of the first magnetic core forming a recording gap with one of ends of the second magnetic core, while the another ends of the first and the second magnetic cores forming a magnetic couple, and a coil insulated by an insulating material and provided in a portion formed between the first and the second magnetic cores whereby magnetic fluxes of the first and the second magnetic cores excited by the coil and leaked from the recording gap being used for recording information onto a magnetic medium, wherein a distance L formed between a front end of the magnetic head in proximity of the recording gap and a contact point of the magnetic couple (referred hereinafter to a yoke length), being set at not more than 20 μm.

Moreover, a second aspect of the present invention is a method of manufacturing the above-mentioned recording head including a magnetic head as mentioned above, wherein the method of manufacturing a recording head comprises the steps of, the first step of forming a seed layer on an insulating material film, the second step of forming resist patterns on the seed layer, the third step of depositing a coil material among the resist patterns by means of plating, the fourth step of removing the resist patterns therefrom, the fifth step of removing the seed layer which once had been existed under the resist patterns, and the sixth step of covering the coil material with an insulating material, and note that in this process, these steps are carried out in this order.

Further, a third aspect of the present invention is a method of manufacturing the recording head having a magnetic head therein as mentioned above, wherein the method of forming the coil including the steps of, the first step of forming an insulation film pattern, the second step of forming groove sections for forming coils on the insulating material film pattern, the third step of forming a seed layer on the insulation pattern where the groove sections have been formed, the fourth step of forming a coil material on the seed layer by means of plating, the fifth step of removing the coil material formed on a portion other than the groove sections and adjusting a height of the surface of the coil material formed on the groove sections and a height of the surface of the insulating material film on the portion other than the groove sections so that both heights coincide with each other, and the sixth step of covering the coil material formed on the portion other than the groove sections and the surface of the insulation film on the portion other than the groove sections with an insulation material, and note that in this process, the above-mentioned steps are carried out in this order.

On the other hand, a fourth aspect of the present invention is a combined head which is configured so that one of the first and second magnetic cores in the above-mentioned recording head, is commonly used as a first magnetic shield, while a reproduced process can be carried out by a magnetoresistive effect element which is provided between the first magnetic shield and a second magnetic shield oppositely arranged to the first magnetic shield.

A fifth aspect of the present invention is a magnetic recording/reproduction apparatus which is provided with the combined head as mentioned above.

Since the recording head, the combined head and the magnetic recording/reproduction apparatus of the present invention adopt the above-mentioned technical structure, even if Co—Ni—Fe film or 45NiFe film having a large amount of saturation magnetization for realizing high recording ability is applied to an upper shield of the combined head, the recording head and the combined head in which a generation of a reproduction noise is suppressed, can be realized.

At the same time, a recording head in which a characteristic of high-saturation magnetization saturation can be maximally utilize as a recording characteristic, by using a magnetic core material having relatively large amount of saturation magnetization, particularly by using a Co—Ni—Fe film whereby saturation magnetization of not less than 1.5 can be obtained, can be realized.

Particularly in Co—Ni—Fe film or Ni—Fe alloy film having Bs of not less than 1.7, as Bs becomes higher, magnetostriction has a tendency to increase towards positive, and thus there arises a problem that a reproduction noise increases. However, with the structure of the present invention, since a reproduction noise can be suppressed even when a material having large amount of magnetostriction is used, a film having higher Bs can be applied to the magnetic cores.

In addition, the recording head, the combined head and the magnetic recording/reproduction apparatus of the present invention can realize a storage device which having large large capacity and being suitable for recording, reproduction and transmission of high speed data, because the above-mentioned recording head, the combined head and the magnetic recording/reproduction apparatus having high recording performance at high frequency and also having a narrow track width suitable for high-density recording.

BRIEF DESCRIPTION OF THE DRAWINGS

FIG. 35—39 present Tables 1.1—3.

DESCRIPTION OF THE PREFERRED EMBODIMENTS

Specific embodiments of a recording head and a manufacturing method thereof according to the present invention will be explained hereunder, with reference to the drawings.

Figure 1:
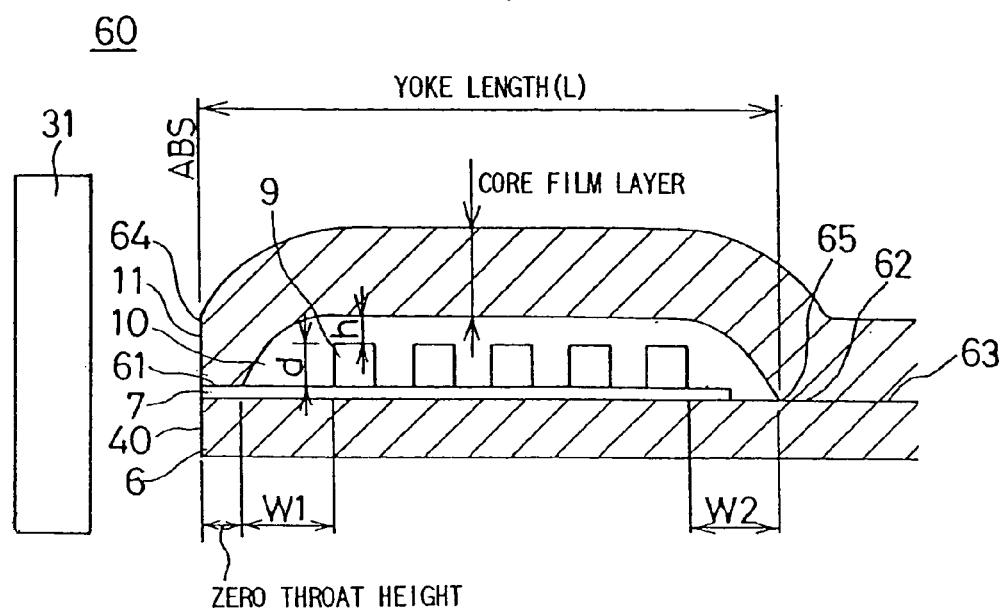
FIG. 1 is a cross section showing a structure of a recording head according to a first embodiment of the present invention.

Namely, FIG. 1 is a cross section showing a structure of one embodiment of the recording head of the present invention.

In FIG. 1, ends 61 on one side of a first magnetic core 6 and a second magnetic core 11 which are opposed to each other, form a recording gap 7, and the other ends 62 thereof, form a magnetic coupling 63, and coils 9 which are insulated by an insulating material 10 are provided between the first magnetic core 6 and the second magnetic core 11.

Magnetic fluxes generated from the first and second magnetic cores 6 and 11 excited by the coils 9, leak from the recording gap 7 so that a magnetic head 60 carries out recording onto a magnetic medium 31, utilizing thus leaked magnetic fluxes.

The recording head 60 is constituted so that a distance L (hereinafter, yoke length) from an end portion 64 of the recording gap proximity to the magnetic medium 31 to a contact point 65 of the magnetic coupling 63 is set to not more than 20 μm.

Figure 3:
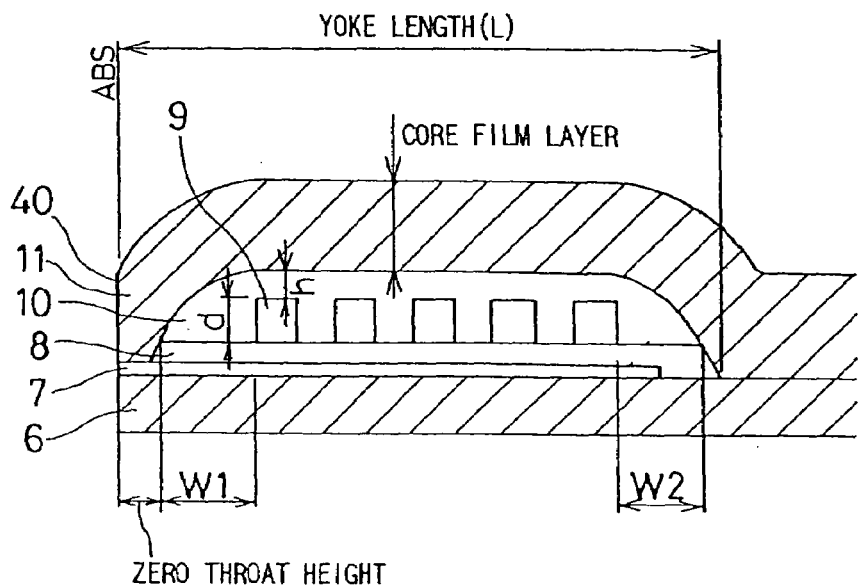
FIG. 3 is a cross section showing another structure of the recording head according to the present invention.

In addition, FIG. 3 shows another structural example of the recording head 60 according to the present invention and shows a case where a photoresist 8 is arranged under the coil as a lower side insulating material which covers the coils 9.

Figure 4:
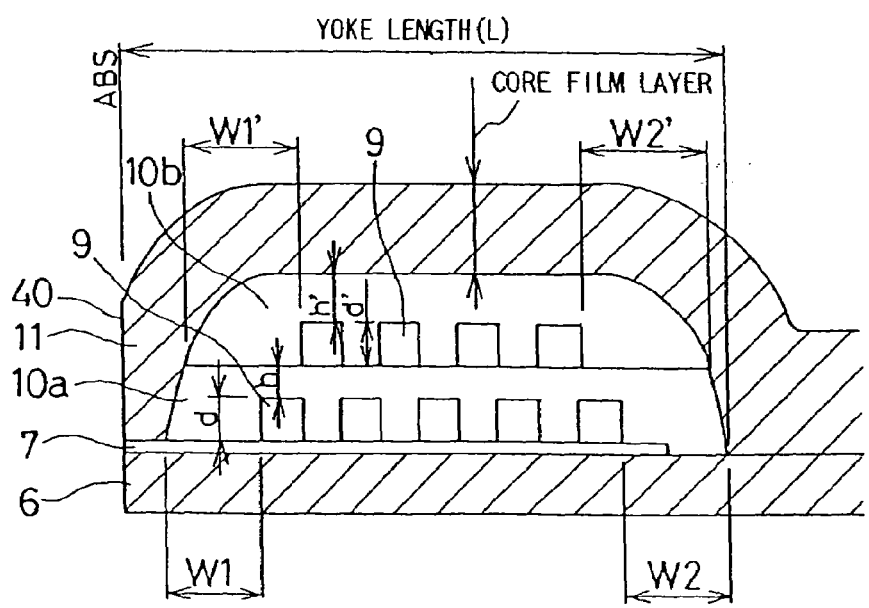
FIG. 4 is a cross section showing another structure of the recording head of the present invention.

Moreover, FIG. 4 shows still another structural example of the recording head 60 according to the present invention and shows a case where the coils 9 has a configuration of two-layered structure.

FIGS. 1, 3 and 4 show names of respective parameters defined in the recording head 60 of the present invention.

Note that, in the above embodiments, the yoke length L is a length from an ABS surface 40 of the magnetic core 11 to the point 65 at which the magnetic core 11 contacts with the magnetic core 6.

Distances from an end portion of the outermost coil to the end portions of insulating materials 10, 10a and 10b which covering the coils from thereabove as shown in Figs as mentioned above, are represented by W1, W2, W1' and W2'.

Thicknesses of the insulating materials 10, 10a and 10b covering the coils 9 and existing upon a top surface of the coils 9 as shown in the above-mentioned Figs, are represented by h and h'.

In addition, in the recording head 60 of the present invention, it is desirable that a portion of at least one of the first and second magnetic cores 6 and 11 opposed to each other and in a vicinity of the recording gap, is composed of a magnetic material, which mainly contains at least two kinds of elements selected from a group consisting of Co, Fe and Ni and has saturation magnetization of not less than 1.5 T.

Further, in the recording head 60 of the present invention, it is desirable at least one of the first and second magnetic cores opposed to each other has a configuration in that a plurality of magnetic material layers each having saturation magnetization the respective amount of which being different from each other and further it is also desirable that the saturation magnetization of the magnetic material layer located in the vicinity of the recording gap is set at a value thereof greater than that of the saturation magnetization of the magnetic material layer which is arranged at a portion far from the recording gap.

In this case, it is desirable that the magnetic material arranged at a portion in the vicinity of the recording gap mainly contains at least two kinds of elements selected from Co, Fe and Ni and the saturation magnetization thereof is set at a level of not less than 1.5 T.

In addition, in the recording head 60 of the present invention, it is preferable that with respect to the yoke length L (unit: μm), a product of said saturation magnetization (unit: T) and the film thickness (unit: μm) of the magnetic materials composing each one of said first and second magnetic cores 6 and 11 opposing to each other, respectively, satisfies the following relationship:

$$0.05 \text{ (T)} \times \text{yoke length } L \text{ (μm)} + 0.5 \text{ (T·μm)} \leq \text{saturation magnetization (T)} \times \text{film thickness (μm)}.$$

In addition, more preferable condition satisfies the following relational expression:

$$0.05 \text{ (T)} \times \text{yoke length (μm)} + 0.5 \text{ (T·μm)} \leq \text{saturation magnetization (T)} \times \text{film thickness (μm)} \leq 4 \text{ (T·μm)}.$$

The inventors of the present invention conducted various experiments in order to solve the above-mentioned problems of the conventional technique and achieved the present invention.

Note that, the inventors understood that a Co—Ni—Fe film or a 45NiFe film with great saturation magnetization for realizing high recording ability which is the above main object of the present invention is arranged in the vicinity of the recording gap in the upper shield or the magnetic core of the recording head so that the recording head and the combined head in which a fluctuation in reproduction property is suppressed can be manufactured.

However, it was found that at this time various technical problems arise, and thus it is necessary to examine countermeasures against the problems.

Therefore, the inventors created samples as shown in Tables 1 through 3. These samples are magnetic heads in which both of the magnetic cores used as an upper core and the magnetic core used as an upper shield in a magnetic head, were formed respectively by selecting each one of a film structures among various film structures as shown in Tables 1 through 3.

The inventors had manufactured various kinds of magnetic heads using these samples, as shown in the above mentioned Tables.

The samples were obtained in such a manner that various permalloy films and magnetic films, in which a structural ratio of compositions of Co, Ni and Fe was variously changed, were manufactured by a plating method or a sputtering method.

In addition, saturation magnetization (T), magnetostriction, specific resistance and film thickness of the respective sample films were changed as shown in Table 1, and the yoke length L in the case where magnetic heads were manufactured by using the sample films as mentioned above, was also changed variously.

Particularly as for the yoke length L, as described in Tables 1 through 3, magnetic heads, in each of which, the yoke length L had been variously changed in a range of 5 μm to 75 μm, were manufactured, and influences upon the recording head 60 in the case where the yoke length was changed, was examined.

Figure 34:
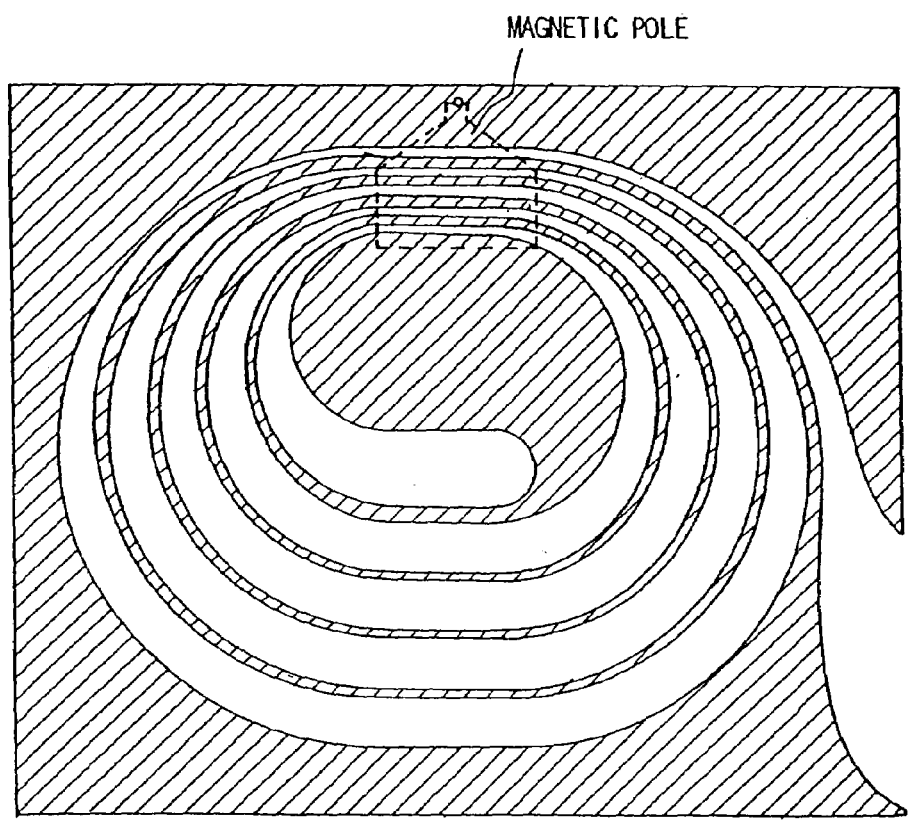
FIG. 34 is a plan view showing an example of a wiring pattern of coils formed in the recording head of the present invention.

Here, with regarding the coils composing the magnetic head, a pattern form as shown in FIG. 34 had been used and the pattern form thereof had been reduced or enlarged in accordance with the yoke length L.

Measurements were made under such condition in which a magnetic field strength (coil winding number×electric current) generated from the coils becomes uniform.

Figure 2:
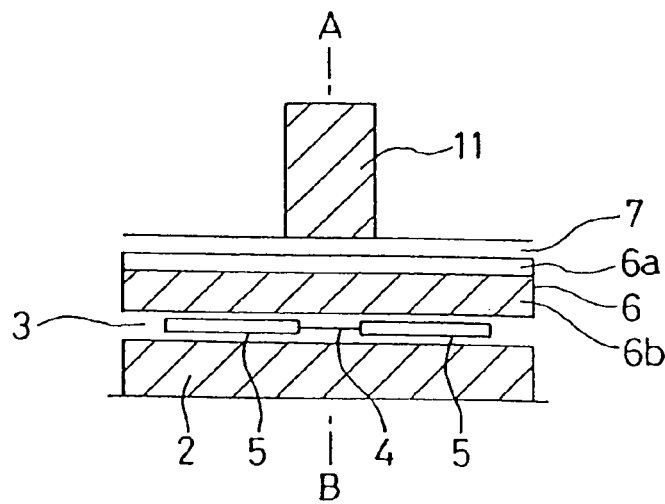
FIG. 2 is a plan view showing a structure viewed from an ABS surface of the recording head according to the first embodiment of the present invention.
Figure 5:
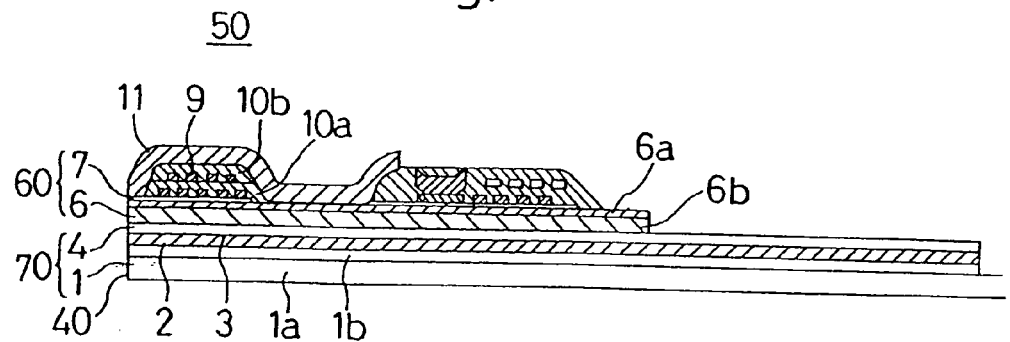
FIG. 5 is a cross section showing a structural example of a combined head of the present invention.
Figure 6:
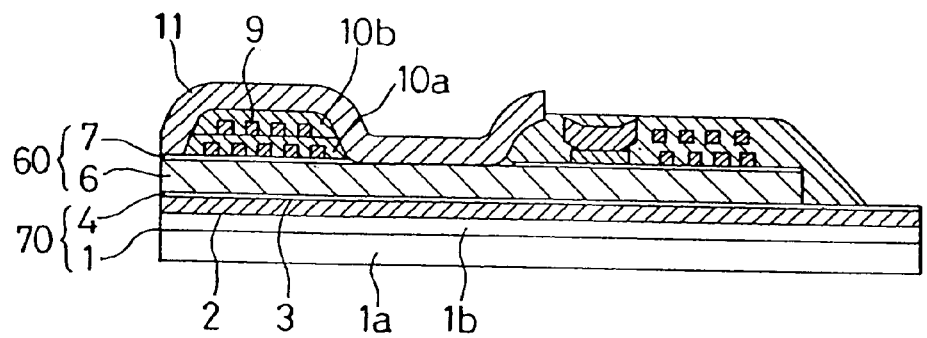
FIG. 6 is a cross section showing a structure of one example of a conventional combined head.
Figure 7:
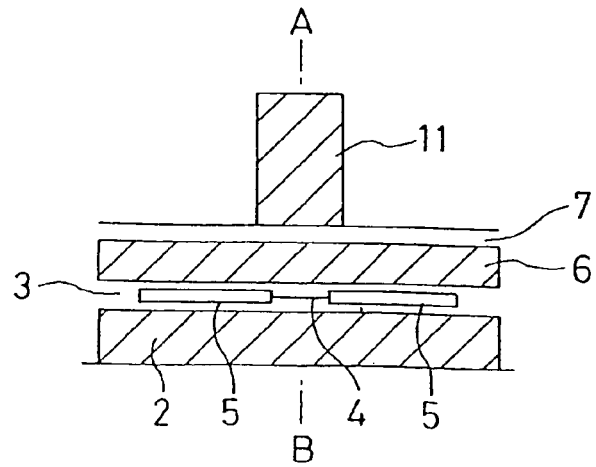
FIG. 7 is a plan view showing a structure viewed from an ABS surface of the conventional combined head shown in FIG. 6.

At first, in the first embodiment of the present invention and comparative examples 1, 2 and 3 shown in Table 1, as shown in FIGS. 2 and 5, as for the structure of the magnetic head, the-coil has a two-layers form, in that the magnetic core 6 is composed of a two-layered magnetic film, while the magnetic core 11 composing the upper shield is composed of a single-layered magnetic film.

Figure 8:
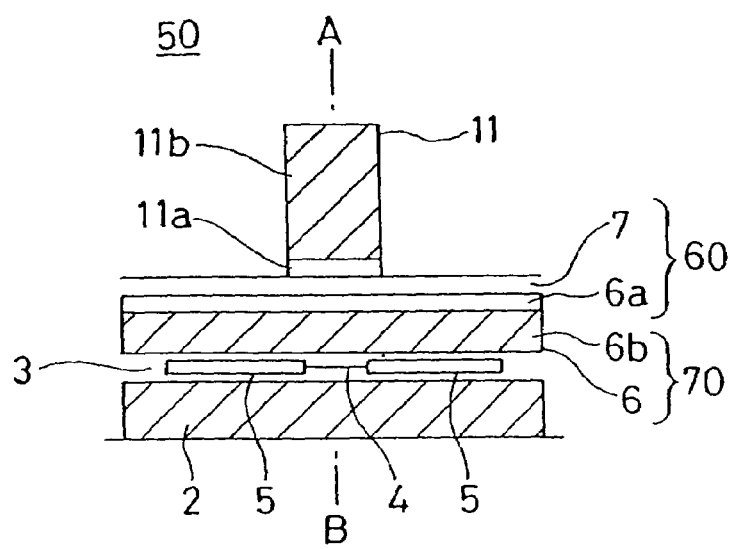
FIG. 8 is a structural diagram viewed from an ABS surface of a combined head according to a second embodiment of the present invention.
Figure 9:
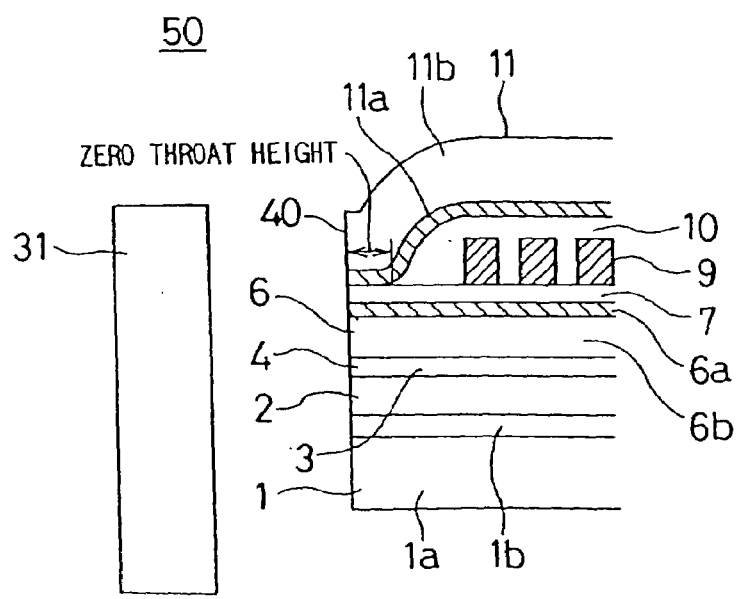
FIG. 9 is a cross section showing the combined head according to the second embodiment of the present invention.

In addition, in a second embodiment of the present invention as shown in Table 2 and comparative examples 4 through 14 as shown in Table 1, the magnetic head has a configuration as shown in FIGS. 8 and 9, the coil has a single-layered form, and the magnetic core 6 is composed of a two-layered magnetic films, and the magnetic core 11 composing the upper shield, is also composed of a two-layered magnetic films.

Figure 11:
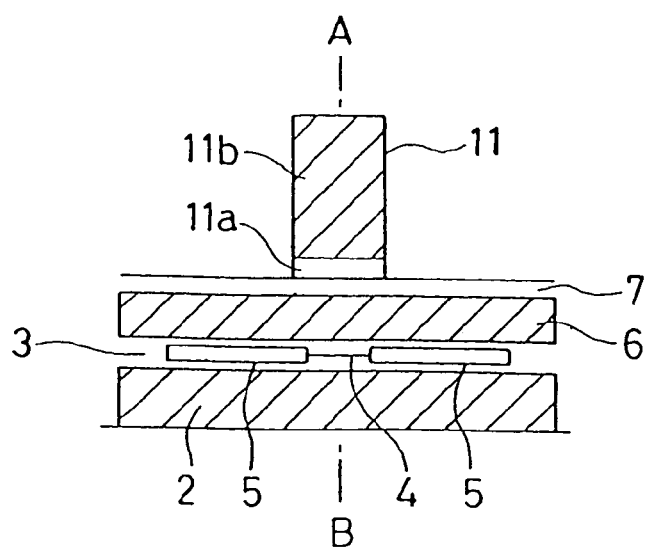
FIG. 11 is a structural diagram viewed from an ABS surface of a combined head according to a third embodiment of the present invention.
Figure 12:
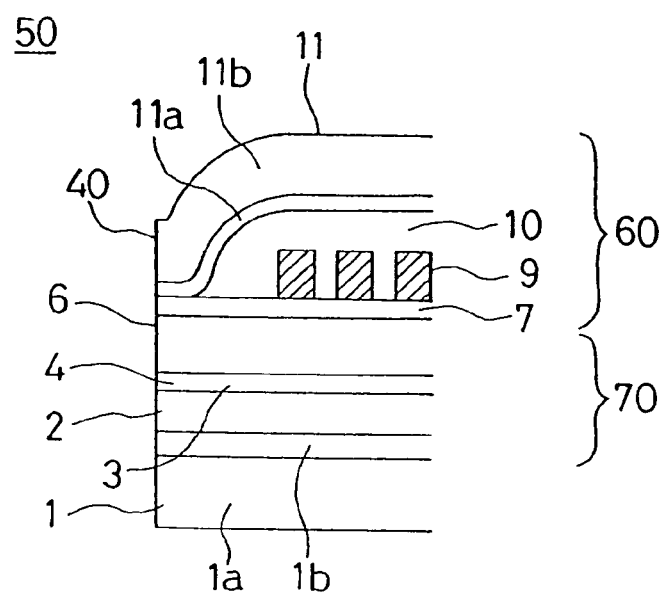
FIG. 12 is a cross section of the combined head according to the third embodiment of the present invention.

In addition, in a third embodiment of the present invention as shown in Table 2, as shown in FIGS. 11 and 12, regarding the structure of the magnetic head, the coil has one-layered form, the magnetic core 6 is composed of a single-layered magnetic film, and the magnetic core11, composing an upper shield, is also composed of a two-layered magnetic films.

Figure 13:
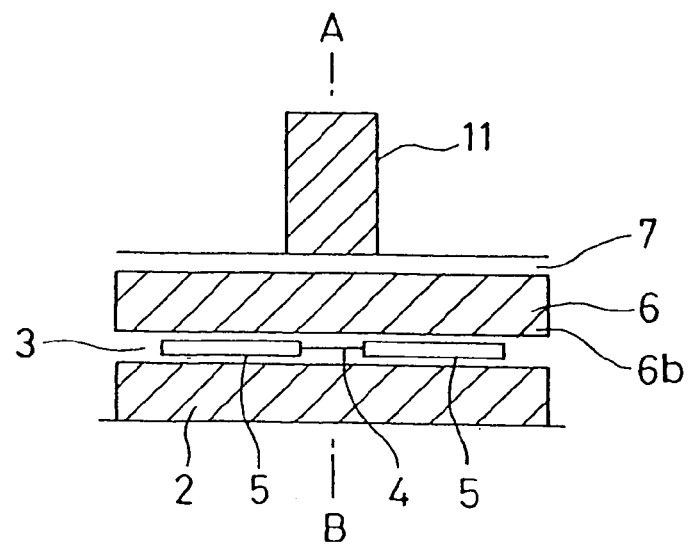
FIG. 13 is a structural diagram viewed from an ABS surface of a combined head according to a fourth embodiment of the present invention.
Figure 14:
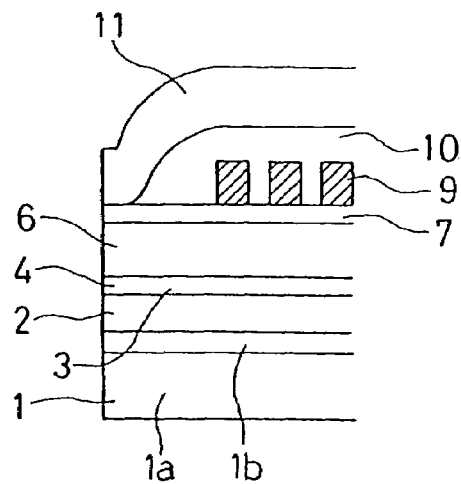
FIG. 14 is a cross section of the combined head according to the fourth embodiment of the present invention.

Further, in a fourth embodiment of the present invention as shown in Table 2, as shown in FIGS. 13 and 14, regarding the structure of the magnetic head, the coil has one-layered configuration, and the magnetic core 6 is composed of a single-layered magnetic film, and the magnetic core 11 composing the upper shield, is also composed of a single-layered magnetic film.

Figure 15:
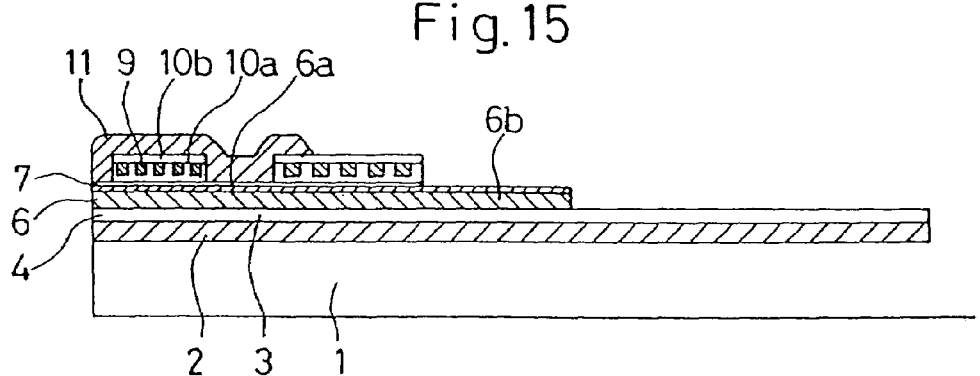
FIG. 15 is a cross section of a combined head according to a fifth embodiment of the present invention.

Further, in a fifth embodiment of the present invention and a comparative example 15 as shown in Table 3, as shown in FIG. 15, regarding the structure of the magnetic head, the coil has one-layered form, and the magnetic core 6 is composed of a two-layered magnetic film, while the magnetic core 11 composing the upper shield, is composed of a single-layered magnetic film.

In addition, evaluations of the respective samples as shown in Tables 1 through 3, adopt a degree of output fluctuation, 30% Roll-off frequency of 100 MHz and 0/W value (dB), mentioned later.

The evaluations were made on a basis that the recording head shows satisfactory characteristic in the case where the degree of output fluctuation is not more than 1.0%, the 30% Roll-off frequency is not less than 100 MHz and the over-write 0/W value (dB) is not less than 30.

In addition, a condition regarding the recording/reproduction was evaluated under conditions that a coercive force of the magnetic medium was 4000 Oe and a magnetic spacing was 35 nm.

At first, a judgment was made from respective characteristic values in the first embodiment.

It was found that when the yoke length was not more than 19 μm, the magnetic head showed satisfactory characteristic in that the degree of output fluctuation will be explained later, was not more than 1.0% and the 30% Roll-off frequency was not less than 100 MHz, regardless of the structure of the magnetic film as well as its manufacturing method.

On the contrary, as shown in the comparative example 1, it was found that when the yoke length was long, the frequency characteristic was particularly deteriorated.

In addition, it is understood that even in the case where a 45NiFe film was used for the upper core 11 and the magnetostriction value of the 45NiFe film is $15 \times 10^{-6}$, the magnetic head shows satisfactory characteristic.

In the comparative examples 2 and 3, even though the sample thereof had the structure which are the same as that in the first embodiment of the present invention, since the thickness of the magnetic core 11 composing the upper shield, was too thin and thus the 0/W value (dB) became remarkably small, the magnetic head of the comparative examples 2 and 3 showed the characteristics not suitable ones for magnetic head.

Figure 18:
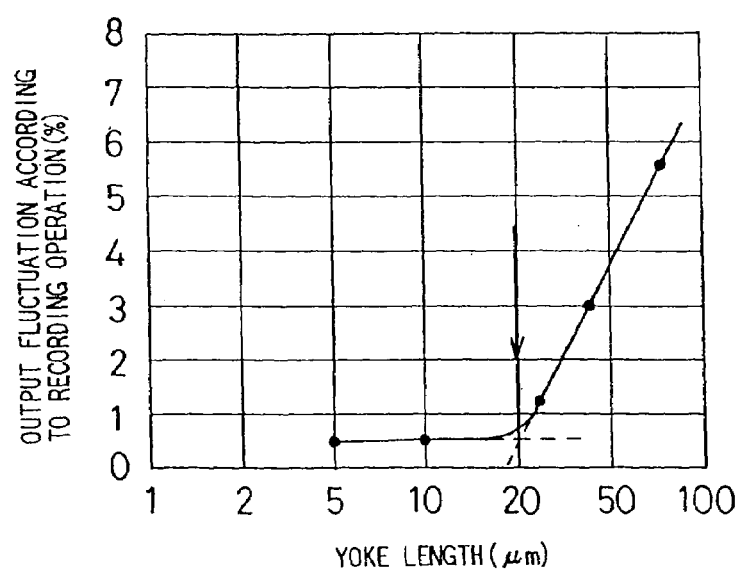
FIG. 18 is a diagram showing a relationship between an output fluctuation and a yoke length L according to a recording operation.
Figure 19:
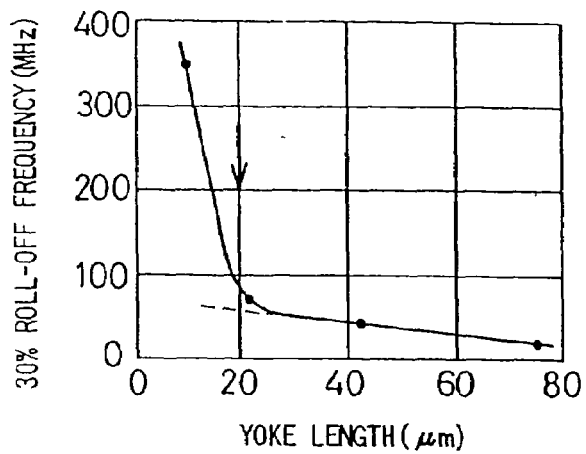
FIG. 19 is a diagram showing a relationship between a frequency of an inductance which is reduced 30% and a yoke length.

Next, according to the results of the second embodiment of the present invention and the comparative examples 4 through 14 where the yoke length L is changed in a range of 23 μm to 75 μm, the output fluctuation according to the recording operation and the 30% Roll-off frequency characteristics are evaluated with respect to the yoke length, and the evaluated results are shown in FIGS. 18 and 19.

"The output fluctuation according to the recording operation" here denotes a ratio of a standard deviation of the reproduction output to an average value of the reproduction output ("standard deviation"/average value of reproduction output") when the reproduction output is measured every after the recording operation had completed.

In this experiment, as shown in FIGS. 8 and 9, in a combined head 50, a Co—Ni—Fe film having saturation magnetization a value of which being strong and magnetostriction being positive, was arranged in a magnetic core 6 a and a magnetic core 11 a located at a portion in a vicinity of a recording gap 7.

Moreover, a permalloy film was arranged on a magnetic core 6b and a magnetic core 11b which are located at a portion far from the recording gap 7.

As is clear from FIG. 18, it is apparent that when the yoke length L is shortened so that it is set at a length being not more than 20 μm, the above-mentioned output fluctuation accompanied with the recording operation is reduced.

Although it had not been pointed out about the noise reduction effect by shortening the yoke length L, in the past, it was found by the present invention that such noise reduction effect by shortening the yoke length L is actually remarkable.

As shown in FIG. 18, when the yoke length is not more than 20 μm, the output fluctuation becomes not more than 1% ("standard deviation"/average value of reproduction output"$\leq 0.01$").

This standard is such that the influence of the recording operation of the recording head can be almost ignored.

Meanwhile, FIG. 19 shows a frequency at which the inductance on a high-frequency side can be reduced upto 30% with respect to the one on a low frequency side (called as "30% Roll-off frequency") when a frequency characteristic of an inductance is measured in the combined head where the yoke length L is changed (the structure is shown in FIGS. 8 and 9).

Here, a reason why the 30% Roll-off frequency was taken as a standard of a high-frequency characteristic, is such that it was found that a non-linear-transition-shift (NILTS) of the recording/reproduction characteristics was less than 20% when the frequency at which an inductance can be reduced by about 30%, is used, and thus the frequency can fall within a satisfactory range as a recording/reproduction system.

In the present invention, the case where the 30% Roll-off frequency is not less than 100 MHz was evaluated as a suitable characteristic of the magnetic head.

As is clear from FIGS. 18 and 19, it was confirmed that the yoke length L of the magnetic head was shortened so that the high-frequency characteristic was improved, and particularly the improvement when the yoke length L is not more than 20 μm was remarkable.

Note that, a cause of the reduction in the output fluctuation due to the shortening of the yoke length L is assumed that qualitatively an influence of effective magnetostriction was reduced by a reduction in a volume of the upper shield to be magnetized at the time of the recording operation.

However, it is quantitatively difficult to estimate how much influence of the reduction in the volume is given substantially as a fluctuation in the reproduction output.

This has never been estimated.

The relationship between the output fluctuation and the yoke length L is quantified at first by the experimental results of the present invention.

The above results show that even if the magnetic film whose magnetostriction is positive, is arranged on the upper shield, the influence of the recording operation which affect on the reproduction characteristic can be made sufficiently small.

Note that, in the case where only a permalloy film is applied to the upper shield like the conventional technique, control of a film composition can be loosened, and production yield can be improved.

In addition, since the Co—Ni—Fe plated film to be used in the embodiments of the present invention (a composition ratio of the elements is such that Co is 60 to 70 wt %, Fe is 15 to 30 wt % and Ni is 5 to 15 wt %) has a film having high Bs, it is suitable for high-density recording, but magnetostriction and stress are strong.

For this reason, this material is particularly preferable for application of the technique of the present invention.

Further, as is clear from the above embodiments, it is found that even the Fe—N film formed by the sputtering method can achieve the object of the present invention.

Figure 20:
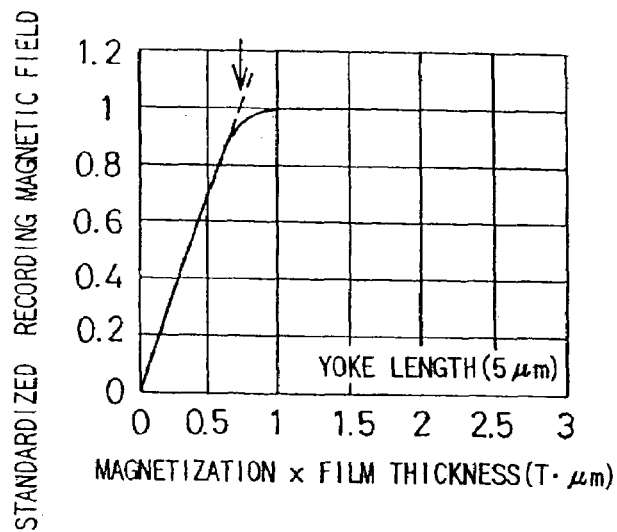
FIG. 20 is a diagram showing a relationship between recording magnetic field and saturation magnetization×film thickness of a magnetic core.
Figure 21:
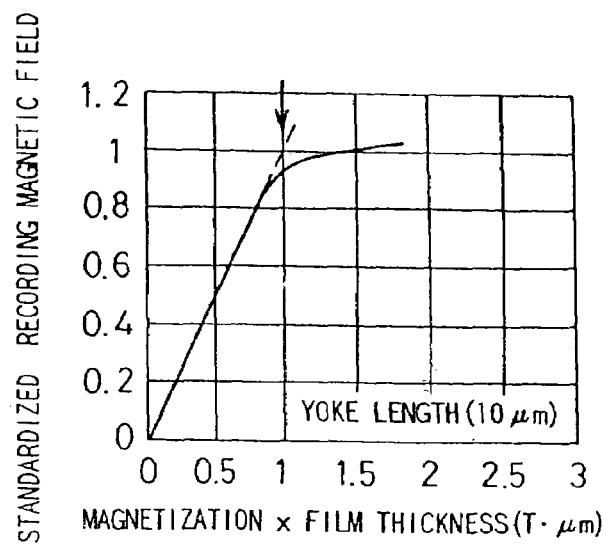
FIG. 21 is a diagram showing a relationship between recording magnetic field and saturation magnetization×film thickness of the magnetic core.
Figure 22:
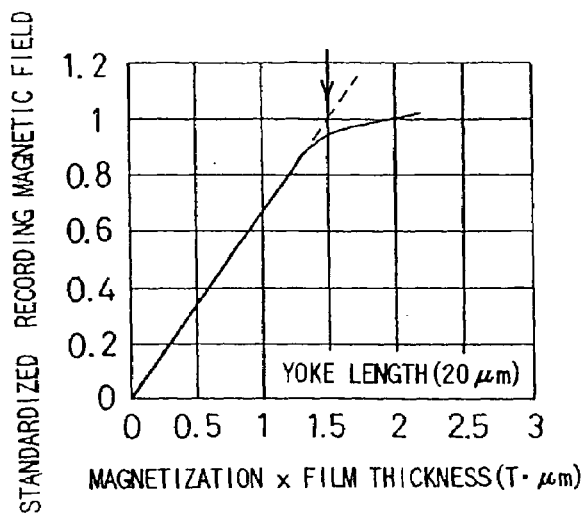
FIG. 22 is a diagram showing a relationship between recording magnetic field and saturation magnetization×film thickness of the magnetic core

Meanwhile, FIGS. 20, 21 and 22 show a relationship between the recording magnetic field strength generated from the recording gap and a product of the saturation magnetization and film thickness of the magnetic core (simulation result) when the yoke length L is set at value such as 5 μm, 10 μm and 20 μm that are seemed to be a short length.

At this time, a length and a depth of the recording gap were set to be constant.

In addition, generated magnetic field of the coils of the respective head (coil winding number×electric current flowing in coils) were set to be constant.

Further, the magnetic field strength is standardized by a saturation value.

As known with reference to the respective diagrams, saturation magnetization that the recording magnetic field strength is saturated×film thickness, becomes 0.75 (T·nm) when the yoke length is 5 μm, becomes 1.00 (T·nm) when 10 μm, and 1.5 (T·nm) when 20 μm, showing that the value of the product is increased as the yoke length becomes longer.

It is found that when a value of the saturation magnetization×film thickness would take a value exceeding than the above values with respect to the respective yoke lengths, the recording magnetic field strength is saturated, namely, sufficient recording magnetic field is obtained.

Note that, when judged from the above results, it is found that in the case where the saturation magnetization is set to be constant, as the yoke length is shorter, the thickness of the magnetic film can be thinner. Namely, it is necessary to set suitable film thicknesses with respect to the yoke lengths.

Thinning of the upper shield is required for bringing a reproduction gap close to a recording gap in accordance with the improvement of the recording density.

Conventionally, as shown in the results, there has been tendency for the output fluctuation after the recording operation to be larger when the upper shield is thinner becomes larger. Therefore, it is found that the yoke length L is set to be short, namely, not more than 20 μm, so that the combined head where the output fluctuation is suppressed can be provided even if a thickness of film used for the upper shield is thinned.

Further, judging from the above results, as the film thickness of the magnetic core is the thinner, the influence of the overcurrent loss becomes the smaller.

In addition, since the width and film thickness of the yoke can be small by shortening the yoke length L, the volume of the magnetic core can be reduced remarkably.

As a result, it is considered that as the yoke length L is shortened further in order to reduce the overcurrent loss in high frequency greatly, the high-frequency characteristic is improved remarkably.

However, from the viewpoint of practical use, the recording characteristic in a frequency bandwidth to be used may be satisfied, and the thickness thereof may be set at any value of thickness for easy manufacturing as long as the above recording characteristic is satisfied.

In the case where the magnetic core film is formed by the plating method, when the film thickness becomes too thin, it is difficult to control the film thickness. Therefore, that the film to be used and having a thickness with some extent, is also advantageous to manufacturing.

Figure 24:
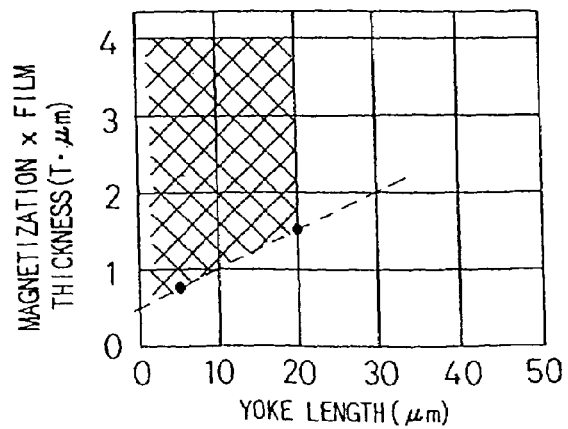
FIG. 24 is a diagram showing a range of the yoke length L and saturation magnetization×film thickness according to the present invention.

Further, FIG. 24 shows a relationship among the yoke length L and the saturation magnetization and the film thickness which shows a preferable characteristic of the recording heads obtained from the characteristic data relating to the recording heads of the respective embodiments.

Namely, FIG. 24 is a graph showing a preferable magnetic core area based on the above-mentioned experimental results.

That is, it is shown that the preferable area of FIG. 24 is set so that the yoke length L is not more than 20 μm, the magnetic core satisfies a relationship of 0.05 (T)×yoke length L (μm)+0.5 (T·μm)≦saturation magnetization (T)× core film thickness (μm).

Note that, the result in FIG. 24 includes a case where the magnetic core is composed of an lamination formed by a plurality of magnetic material films.

That is, in the case where of two-layered magnetic film, the value of the saturation magnetization (T)×core film thickness (μm) is a value of a total sum Σ of products each comprising a product of saturation magnetization (T) of the respective magnetic material forming a part of the magnetic core×core film thickness (μm) thereof, namely a total sum Σ of (saturation magnetization (T)×core film thickness (μm)).

In this case, it is desirable for the magnetic core to be set to satisfy a relationship, such as 0.05 (T)×yoke length L (μm)+0.5 (T·μm)≦Σ (saturation magnetization (T)×film thickness (μm)).

Further, in the case of the Co—Ni—Fe plated film having a large saturation magnetization is used, its stress will arises a further problem.

For example, since the Co—Ni—Fe plated film having the saturation magnetization of 2 T occasionally has a stress of about 0.8 GPa, if the film was too thick, the film would be peeled.

Figure 23:
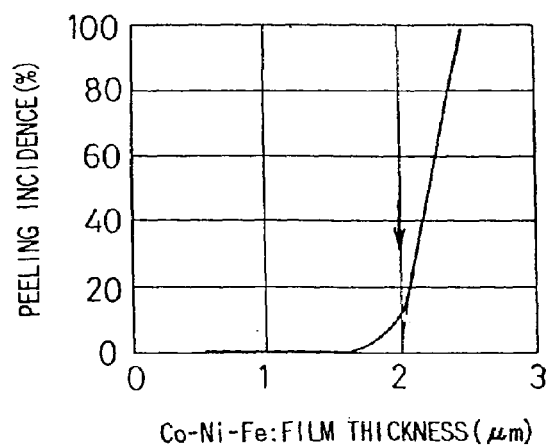
FIG. 23 is a diagram showing a relationship between peeling incidence and a film thickness of a magnetic core film (saturation magnetization is constant, i.e., 2 T)

FIG. 23 is a diagram showing a relationship between the film thickness and film peeling incidence of the Co—Ni—Fe plated film having saturation magnetization of 2 T.

As understood from the diagram, when the film thickness exceeds 2 μm, peeling abruptly occurs.

As a result, in the present invention, in the case where the Co—Ni—Fe plated film having high Bs is used, it is desirable that the yoke length L is set to be not more than 20 μm and the magnetic core satisfies the relationship: 0.05 (T)×yoke length L (μm)+0.5 (T·μm)≦(saturation magnetization (T)×core film thickness (μm)≦4(T·μm).

As mentioned above, in the respective samples shown in Tables 1 through 3, in the case of the coils whose winding number is 5 turns or the coils which are arranged in two layer configuration as shown in FIG. 34, coils with 9-turn winding number are used.

Therefore, when the yoke length L is shorter, accordingly the width of the coils passing through between the magnetic cores is thinner than the width of coils with the same winding number arranged in the other places.

Therefore, the width of the coils passing through between the magnetic cores changes in accordance with the yoke length L.

Accordingly, it is preferable that the coils to be used for the magnetic head of the present invention passes through a space formed between the opposed first and second magnetic cores via the insulating material, and the width of the coils passing through the space viewed from an upper surface (direction of FIG. 34) is narrower than the width of the coils arranged in the places other than the space. As a result, an increase of the coil resistance can be suppressed.

That is, as for the coil portions formed between the magnetic cores, it is necessary to decrease the width of the coils as the yoke length L is shorter. However, when the width of the coils is decreased, the coil resistance is increased.

For this reason, in order to suppress the increase of the coil resistance, a portion which does not require for reducing the width of the coils, namely, a portion other than the coil portion formed between the magnetic cores is enlarged.

As a result, the increase of the coil resistance in all the coils can be suppressed.

Since the present invention is characterized particularly in that the yoke width L is set to be not more than 20 μm, it is necessary to reduce the width of the coil portion formed between the magnetic cores particularly.

Therefore, in the present invention, gaps between the coils are changed suitably as mentioned above so that the coil resistance is suppressed. This produces a great effect.

In the embodiments in Tables 1 through 3, when the yoke length L becomes short, in order to make the generated magnetic field of the coils (=coil winding number×electric current) to be constant with uniform electric current, it is necessary to narrow the width of the coils and make the winding number to be uniform.

However, in general, since all the coil magnetic fields are absorbed by the yoke, according to the physical consideration, the output from the magnetic head does not change even if the coils become thin or thick.

Figure 33:
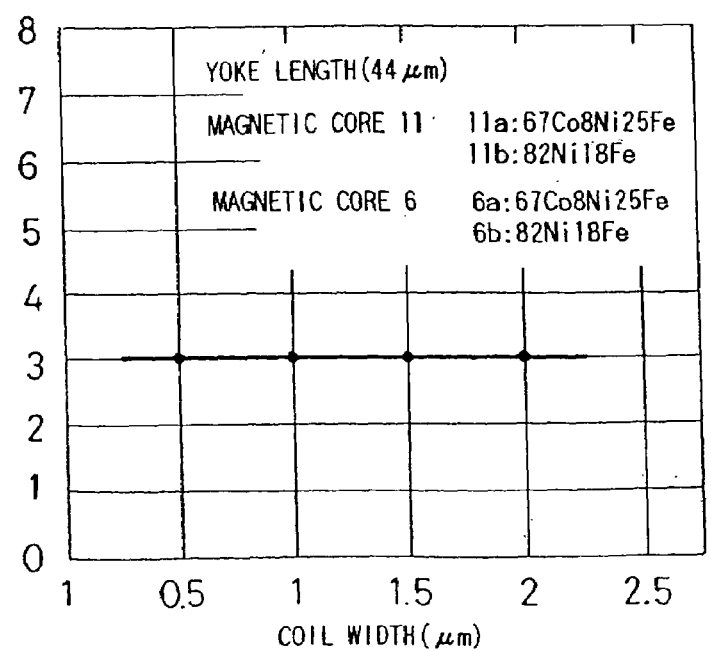
FIG. 33 is a graph showing a relationship between a coil width and the output fluctuation in relation with the recording head of the present invention.

FIG. 33 shows results of measuring the output fluctuation (%) in the case where the width of the coils passing through between the magnetic cores is changed in the magnetic head in which the yoke length L is set to 44 μm and the magnetic core 11 serving as an upper core comprising two layers, one of which being the magnetic core 11a made of 67Co8Ni25Fe, while another being the magnetic core 11b made of 82Ni18Fe, the magnetic core 6 serving as the upper shield comprising two layers, one of which being the magnetic core 6a made of 67Co8Ni25Fe, while another being the magnetic core 6b is made of 8Ni18Fe, As understood from FIG. 33, even if the width of the coil is changed, the output fluctuation in the magnetic head is not influenced.

This shows that the generated magnetic field of the coils is not related to the width of the coils, and the change in the width of the coils cannot become a physical factor which can affect the output fluctuation of the magnetic head.

Similarly, in the respective embodiments of the present invention, it is found that when the composition composing the magnetic core is changed, the value of magnetostriction is also changed.

Figure 32:
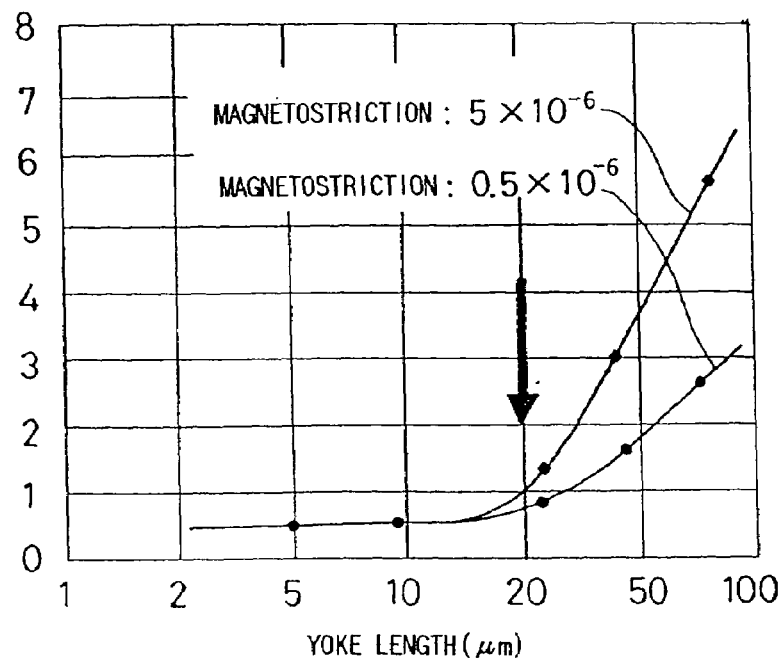
FIG. 32 is a graph showing a relationship between the output fluctuation and the yoke length L according to the recording operation of the recording head of the present invention where magnetostriction is shown as a parameter.

However, as shown in FIG. 32, similarly to FIG. 18, comparative experiment was conducted as to the relationship between the yoke length L and the value of the output fluctuation with respect to the magnetic material films one of which having the magnetostriction being is $5 \times 10^{-6}$ and another one having the magnetostriction is $0.5 \times 10^{-6}$.

As a result of examination about the difference, it was found that a condition in that the output fluctuation becomes not more than 1%, is such that the yoke length L is set at a value not more than 20 μm in any cases.

Therefore, it is understood that when the yoke length L is not more than 20 μm, the value of the output fluctuation is not influenced by the magnetostriction.

Therefore, as mentioned above, the effect, which is obtained by shortening the yoke length L in the magnetic head to be not more than 20 μm, can be obtained regardless of the other various factors.

Next, a problem of the stress in the steps of manufacturing the magnetic head of the present invention was examined.

As mentioned above, particularly a plated film having larger saturation magnetization has a strong stress, and the Co—Ni—Fe film occasionally has a stress of about 0.8 GPa. For this reason, when the film is too thick, the film is peeled the more.

FIG. 23 is a graph showing a relationship between the film thickness and the film peeling incidence when the Co—Ni—Fe film having saturation magnetization of 2 T is deposited by the plating method.

Note that, when the film thickness become a value exceeding over 2 μm, the peeling incidence abruptly increases. That means that in order to manufacture a recording head having great saturation magnetization, it is necessary that the thickness of the magnetic core should be not more than 2 μm.

Next, in the case where the magnetic head of the present invention is manufactured, technical problems relating to the structure of the recording head or production head were examined.

Particularly in the present invention, since it is considered that the manufacturing of the magnetic head by means of the plating method is advantageous, the plating method was mainly examined.

That is, as mentioned above, in a specific embodiment of the method of manufacturing the recording head according to the present invention, will be explained below.

In a method for producing a recording head including a magnetic head comprising a first magnetic core and a second magnetic core, each being oppositely arranged to each other, one of ends of said first magnetic core forming a recording gap with one of ends of said second magnetic core, while the another ends of said first and said second magnetic cores forming a magnetic couple, and a coil insulated by an insulating material and provided in a portion formed between said first and said second magnetic cores whereby magnetic fluxes of said first and said second magnetic cores excited by said coil and leaked from said recording gap being used for recording information onto a magnetic medium, a method for forming the coil comprises the steps of, the first step of forming a seed layer on an insulating material film, the second step of forming resist patterns on the seed layer, the third step of depositing a coil material among the resist patterns by means of plating, the fourth step of removing the resist patterns therefrom, the fifth step of removing the seed layer which once had been existed under the resist patterns, and the sixth step of covering the coil material with an insulating material, and note that in this process, these steps are carried out in this order.

In addition, another specific embodiment of the method of manufacturing the recording head 60 according to the present invention will be described below.

In a method for producing a recording head including a magnetic head comprising a first magnetic core and a second magnetic core, each being oppositely arranged to each other, one of ends of said first magnetic core forming a recording gap with one of ends of said second magnetic core, while the another ends of said first and said second magnetic cores forming a magnetic couple, and a coil insulated by an insulating material and provided in a portion formed between said first and said second magnetic cores whereby magnetic fluxes of said first and said second magnetic cores excited by said coil and leaked from said recording gap being used for recording information onto a magnetic medium, a method for forming the coil including the steps of, the first step of forming an insulation film pattern, the second step of forming groove sections for forming coils on the insulating material film pattern, the third step of forming a seed layer on the insulation pattern where the groove sections have been formed, the fourth step of forming a coil material on the seed layer by means of plating, the fifth step of removing the coil material formed on a portion other than the groove sections and adjusting a height of the surface of the coil material formed on the groove sections and a height of the surface of the insulating material film on the portion other than the groove sections so that both heights coincide with each other, and the sixth step of covering the coil material formed on the portion other than the groove sections and the surface of the insulation film on the portion other than the groove sections with an insulation material, and note that in this process, the above-mentioned steps are carried out in this order.

In the method of manufacturing the recording head 60 of the present invention, it is desirable that the coil material mainly contains Cu and the seed layer mainly contains Cu.

Further, in the method of manufacturing the recording head of the present invention, it is preferable that the seed layer is formed on a primary layer made of at least one kind of material selected from a group of Ta, TaN, Ti and TiN in order to prevent dispersion.

There will be detailed below the recording head 60 and the manufacturing method thereof according to the present invention as an embodiment.

Namely, FIGS. 1, 2 and 5 are diagrams showing structures of one portion of the recording head 60 according to the first embodiment of the present invention as shown in Table 1.

FIG. 1 is a cross sectional view viewed vertically to an ABS surface 40 which opposes to the recording medium 31.

FIG. 2 is a plan view taken along the ABS surface 40 (namely, FIG. 1 is a cross section taken along a line A–B in FIG. 2).

In addition, FIG. 5 is a cross sectional view showing one specific embodiment of the structure of the combined head 50 including the recording head 60 of the present invention and a suitable reproduction head 70.

In FIG. 5, a substrate 1 to be a slider is composed of a combined ceramic 1a made of alumina and titanium carbide and an alumina film 1b. A GMR head 70 having reproducing function is formed thereon.

The GMR head 70 is disposed between a lower shield 2 made of a patterned Co—Zr—Ta—Cr film having a thickness of 1 μm (having a composition showing a soft magnetic characteristic, for example, Co87Zr5Ta5Cr3) and an upper shield 6 via a magnetic separation layer 3 made of alumina and which being made of a magnetoresistive effect element 4.

Furthermore, a gap length between the lower shield 2 and the upper shield 6 is 0.12 μm.

The magnetoresistive effect element 4 is, as shown in FIG. 2, comprises a center area 4 which senses a magnetic field from the recording medium 31 and an end area 5 which supplies a bias magnetic field and an electric current to the center area 4.

The center area 4 is composed of a laminated structure having the GMR effect generally called as a spin-valve effect.

More specifically, the center area 4 is constituted so that a primary Zr film (having a thickness of 3 nm), a Pt—Mn film (having a thickness of 20 nm), a Co—Fe film (having a thickness of 2 nm), a Cu film (having a thickness of 2.1 nm), a Co—Fe film (having a thickness of 0.5 nm), an Ni—Fe film (having a thickness of 2 nm) and a Zr film (having a thickness of 3 nm) are laminated in this order from the side of the lower shield 2.

A width of the center area 4 is 0.4 μm defining a width of a reproduction track.

In addition, the end area 5 comprises a laminated structure of a Co—Pt film (having a thickness of 20 nm) as a permanent magnet film and an Au film (having a thickness of 50 nm) as an electrode film.

On the other hand, the upper shield 6 can be commonly used as the first magnetic core 6 of the recording head 60.

The upper shield 6 is composed of a permalloy film 6b having a thickness of 2 μm and a Co—Ni—Fe film having a thickness of 0.5 μm (having a composition showing the soft magnetic characteristic, for example, 65Co12Ni23Fe) 6a.

Further, in the recording head 60 of the present invention, the upper shield 6 is used as the first magnetic core 6, and zero throat height is defined by a non-magnetic insulating material 10a which exists via the recording gap 7 made of alumina having a thickness of 0.18 μm formed on the magnetic core 6.

The non-magnetic insulating material 10a is made of a photoresist. The coil 9 has a two-layered structure made of Cu plated films, and the first layer is insulated by the non-magnetic insulating material 10a, and the second layer is insulated by a non-magnetic insulating material 10b.

The second magnetic core 11 is formed so as to be laid over the structure which is composed of the coils 9 and the non-magnetic insulating material 10.

The second magnetic core 11 is composed of a Co—Ni—Fe film having saturation magnetization of 2 T (having a composition showing the soft magnetic characteristic, for example, 65Co12Ni23Fe). The yoke length of the magnetic core 11 is 9.5 μm, and its thickness is 1 μm.

Figure 10:
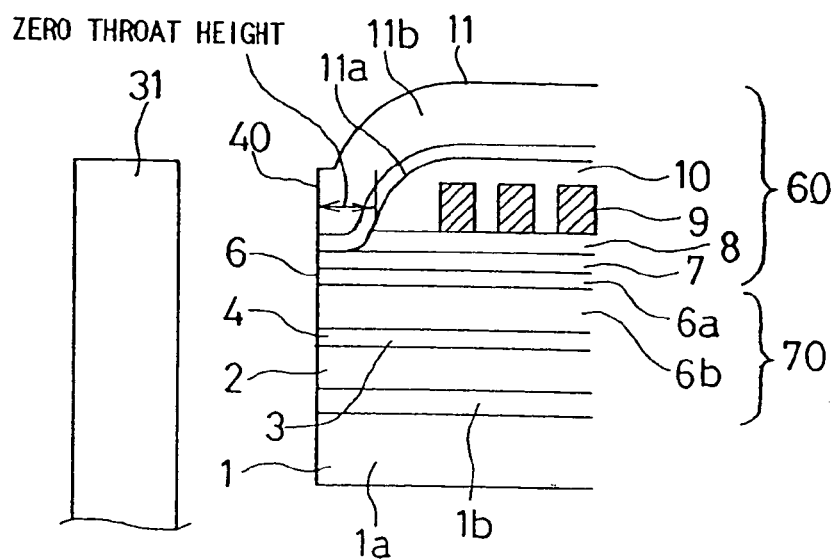
FIG. 10 is a cross section showing another structure of the combined head according to the second embodiment of the present invention.

Next, FIGS. 8, 9 and 10 show structural examples of the combined head 50 using an one embodiment of the recording head according to the second embodiments of the present invention as shown in Table 2.

FIG. 8 is a structural diagram viewed from the ABS surface 40 opposed the recording medium 31.

FIGS. 9 and 10 are cross sectional views (AB section of FIG. 8) which are vertical to the ABS surface 40.

The combined head 50 in a specific embodiment has a structure in that one embodiment of the recording heads 60 in the second embodiments and a suitable reproduction head 70 are laminated.

The drawings show that a reproduction head 70 which is composed of the lower shield 2, the GMR element 4 and the upper shield 6 and a recording head 60 of the second embodiment in which the upper shield 6 is used as a first magnetic core 6 are formed on the substrate 1 to be a slider.

The zero throat height in the recording head 60 of the specific embodiment, is defined by the non-magnetic insulating material 10 as shown in FIG. 9 and by a non-magnetic insulating material 8 as shown in FIG. 10.

In addition, in this specific embodiment, the coil 9 has a single-layered structure.

Further, a second magnetic cores 11 of one embodiment of the recording heads 60 in the present embodiment, has a laminated structure of a Co—Ni—Fe film having saturation magnetization of 2 T (having a composition showing the soft magnetic characteristic, for example, 65Co12Ni23Fe) 11a and a permalloy film 11b.

In a more detailed structure of a part of the embodiments of the magnetic core 11 in the second embodiment, the yoke length L of the second magnetic core 11 is 9.5 m, the thickness of the Co—Ni—Fe film 11a being 0.6 μm, and the thickness of the permalloy film 11b being 1 μm.

Next, FIGS. 11 and 12 show examples of partial structures in the third embodiment of the present invention as shown in Table 2.

Namely, in the third embodiment of the present invention, similarly to the second embodiment, the combined head 50 including the recording head 60 of the present invention is formed.

FIG. 11 is a plan view showing the structure viewed from the ABS surface 40 opposed to the recording medium 31.

FIG. 12 is a cross sectional view showing the structure viewed in a cross section vertical to the ABS surface 40, namely, a cross section taken along line A–B in FIG. 11.

In a part of example of this embodiment, a combined head comprising a optional reproduction head 70 consisting the lower shield 2, a GMR element 4 and an upper shield 6 which are formed on the substrate 1 to be used as a slider and a recording head 60 of the first embodiment which is formed on the reproduction head 70 and in which an upper shield 6 is used as a first magnetic core 6.

The structure of the recording gap 7 in a part of the present embodiments is similar to that in the first embodiment of the present invention.

The upper shield 6 is composed of a Co—Ni—Fe film having a thickness of 2 μm (having a composition showing the soft magnetic characteristic, for example 65Co12Ni23Fe).

The second magnetic core 11 is composed of a laminated structure of a Co—Ni—Fe film 11a having saturation magnetization of 2 T (having a composition showing the soft magnetic characteristic, for example, 65Co12Ni23Fe) and a permalloy film 11b.

Here, in the present embodiment, the yoke length L of the magnetic core 11 is 9.5 μm, the film thickness of the Co—Ni—Fe film 11a is 0.6 μm, and the thickness of the permalloy 11b is 1 μm.

On the other hand, FIGS. 13 and 14 are diagrams showing the combined head 50 including the recording head 60 according to a fourth embodiment of the present invention.

FIG. 13 is a plan view showing the structure viewed from the ABS surface 40 opposed to the recording medium 31.

FIG. 14 is a cross section vertical to the ABS surface 40 opposed to the recording medium 31, namely, a cross section taken along line A–B in FIG. 13.

The present embodiment shows the structure that the recording head 60 in which an upper shield 6 is used as a first magnetic core 6, as the same manner as shown in the above-mentioned embodiment, is mounted onto a reproduction head 70 consisting the lower shield 2, a GMR element 4 and an upper shield 6 which are formed on the substrate 1 to be used.

The structures of the recording gap 7 and the second magnetic core 11 are the same as those in the first embodiment of the present invention.

In addition, the upper shield 6 in the recording head in one example of the present embodiments is a Co—Ni—Fe film having a thickness of 2 μm (having a composition showing the soft magnetic characteristic, for example, 65Co12Ni23Fe).

As explained above, as for the respective samples according to the above-mentioned respective embodiments, the composition, the manufacturing method, the saturation magnetization, the magnetostriction, specific resistance of the magnetic films composing the upper shield 6 (6a, 6b) and the second magnetic core 11 (11a, 11b) as used and obtained data of the characteristic values relating to the reproducing function by measuring same in changing the film thickness and the yoke length L of the magnetic films are shown in Table 1, and the characteristic values of the conventional combined head which having a yoke length being longer than that in the present embodiment in Table 1, as comparative data.

As is clear from the above-mentioned comparative experimental results, the low-noise characteristic and the satisfactory high-frequency characteristic of the present invention are clear, and the 0/W characteristic is also sufficient.

Next, the method of manufacturing the recording head 60 of the present invention will be examined.

The recording head in which the yoke length L is not more than 20 μm has not been conventionally manufactured.

Moreover, in order to manufacture a magnetic core with short yoke length L, width, thickness of the coils, coil gap, a positional relationship between an insulating material for insulating the coils and the coils, thickness of the insulating material or the like should be set suitably.

Among them, the width and thickness of the coil and the coil gap are set arbitrary with respect to required coil winding number and coil resistance.

At this time, exposure resolution at the time of forming a coil pattern mainly defines the limit.

In addition, in a case where the coil resistance becomes too large, as mentioned above, it is effective to set the coil width on the coil portion which does not pass through between the magnetic cores as shown in FIG. 33 to be wider than the coil width of the coil portion which passe through between the magnetic cores.

On the other hand, as the yoke length L becomes shorter, it is necessary to change the volume of the insulating material for insulating the coils suitably.

Note that, when the thickness of the insulating material becomes too thin, there arises a problem of defective coil insulation.

Therefore, various samples were created, and their drape of the outermost coils and drape of the coil upper surface which easily cause the defective coil insulation were evaluated.

Figure 25:
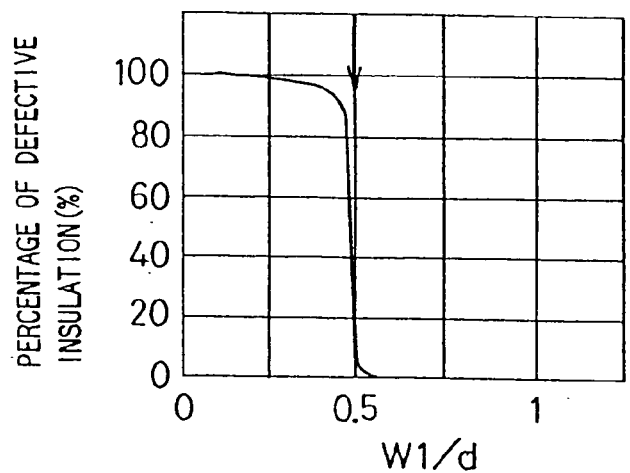
FIG. 25 is a diagram showing insulation percent defective and a positional relationship between a coil and an insulating film.

The evaluated results are shown in FIG. 25. Namely, FIG. 25 shows relationships between a ratio W1/d whereby a distances W1 and W2 (μm) measured from the outermost coils to the end of the insulating material 10 covering the coils 9 from the upper side thereof as shown in FIG. 1, for example, is compared with a thicknesses d of the coils 9 (μm), and a percentage of generation of the defective insulation, with respect to an optimal positional relationship among each one of portions of the recording head 60.

The method of manufacturing the coils and the insulating material at this time is composed of, for example as shown in FIG. 30, (a) the step of forming a seed layer 13 on an insulation film 12, (b) the step of forming resist patterns 14 on the seed layer, (c) the step of forming coil materials 15 among the resist patterns by means of plating, (d) the step of removing the resist patterns, (e) the step of removing the seed layer once existed under the resist patterns and (f) the step of covering the coils with an insulating material 16 by means of resist.

Namely, as shown in FIG. 25, the defective insulation is almost eliminated when W1/d is not less than 0.5.

This is because when the distance from the end of the coils to the end of the insulating material is secured sufficiently for the thickness of the coils 9, a covering factor at a corner portion of the outermost coil 9 is secured sufficiently.

This tendency is applied also to W2/d, W1'/d' and W2'/d' in the structure of the recording head 60 of the present invention shown in FIGS. 1 through 3.

Figure 26:
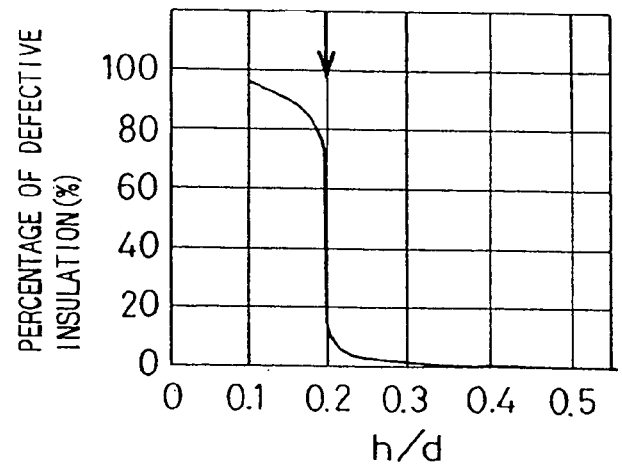
FIG. 26 is a diagram showing a relationship between the insulation percent defective of the coil and insulating layer thickness (h)/coil thickness (d) on the coil.

On the other hand, FIG. 26 shows a relationship between a ratio h/d of a thickness h (μm) of the insulating material for covering the coils 9 on the coils 9 to a thickness d (μm) of the coils and a percentage of the defective insulation.

The method of manufacturing the coil section is the same as that in FIG. 25. The defective insulation is almost eliminated when h/d is not less than 0.2.

This is because when the film thickness of the resist on the coils 9 is thin, unevenness among the coil remains on the surface, and a covering factor is not sufficient at the corners of the coils 9.

This tendency is applied to lower layer coils and upper layer coils when the coils has a two-layered structure as shown in FIG. 3, for example.

In addition, a condition in that W1/d≧0.5 where the defective insulation is eliminated as shown in FIG. 25, can be held when h/d≧0.2 shown in FIG. 26.

Namely, in the recording head of the present invention, when the thickness of the coils 9 is d (μm) and the distances from the outermost end coil 9 to the end of the insulating material 10 for covering the coils 9 are W1 and W2 (μm), it is desirable that the distances W1 and W2 (μm) satisfy the following relationships:

$$W1/d \geq 0.5 \text{ and } W2/d \geq 0.5.$$

Further, in the recording head 60 of the present invention, when the thickness of the coil 9 is d (μm) and the thickness of the insulating material 10 for covering the coil 9 on the coil is h (μm), it is desirable that the thickness h (μm) satisfies the following relationship:

$$h/d \geq 0.2.$$

In the case where the structure and the step of covering the coils 9 using the resist 10 are used as mentioned above, the above prescriptions are required. For example, in the case of i-beam stepper exposure, the width and gaps of the coils capable of being manufactured at the above step are estimated at 0.8 μm and 0.3 μm respectively.

These are realizable dimensions which can be estimated from that the resist pattern requires a height of about 2 μm and adhesive properties of the resist pattern at the time of plating are required in order to secure the coil thickness of about 1 μm.

At this time, when the coils 9 have a two-layered structure in that a coil in the lower layer has 5 turns while and a coil in an upper layer has 4 turns, the yoke length becomes about 10 μm.

The combined head 50 produced by the present invention is shown in FIG. 5, for example.

Figure 31:
FIGS. 31(a) through 31(h) are step diagrams showing another examples of the steps of manufacturing the recording head of the present invention.
Figure 31:
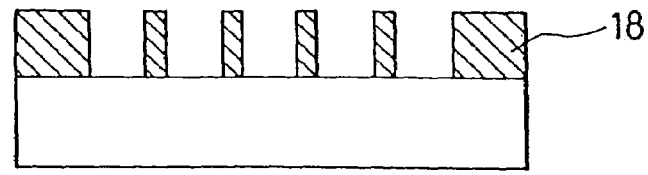
Figure 31:
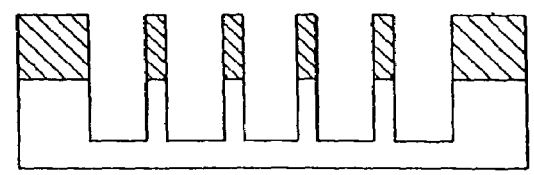
Figure 31:
Figure 31:
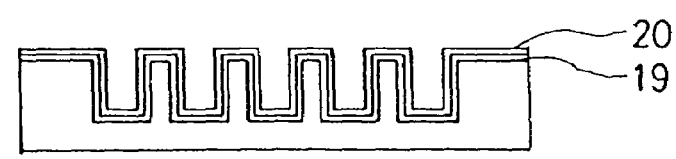
Figure 31:
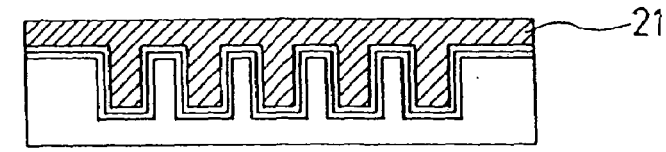
Figure 31:
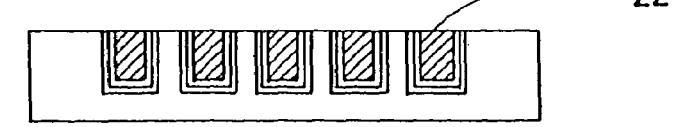
Figure 31:
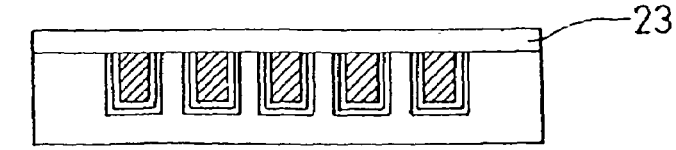

It is desirable that a method which realizes a shorter yoke comprises, as shown in FIG. 31, (a) the step of forming an insulating material film pattern 17, (b) the step of forming resist patterns 18 as the step of forming groove sections for forming coils on the insulating material film pattern, (c) the step of etching by means of the resist patterns, (d) the step of removing the resist patterns, (e) the step of forming a lower primary layer 19 a seed layer 20 on the insulating material pattern where the groove sections are formed, (f) the step of forming a coil material 21 on the seed layer by means of plating, (g) the step of removing the coil material formed on places other than the groove sections by means of polishing process and adjusting a height of the surfaces of coil materials 22 and a height of the surface of the insulating material film other than the groove sections so that the both heights having the same level as each other, and (h) the step of covering the coil materials formed in the groove sections and the surface of the insulating material film other than the groove sections with an insulating material 23.

According to this method, since a thickness of the resist for patterning the insulating material film 17 is about 1 μm, the width and gaps of the coils can be about 0.3 μm and 0.3 μm respectively.

Namely, according to the manufacturing method, the coils can be manufactured so that their width and gaps are more precise.

In addition, this method is not restricted by the relationship between W and d and the relationship between h and d which are the prescriptions in the method of FIG. 30.

With this manufacturing method, the magnetic core with the yoke length L of not more than 20 μm can be produced, and further the magnetic core with yoke length L of not more than 5 μm can be produced. The combined head which is manufactured by this method is shown in FIG. 15.

Figure 16:
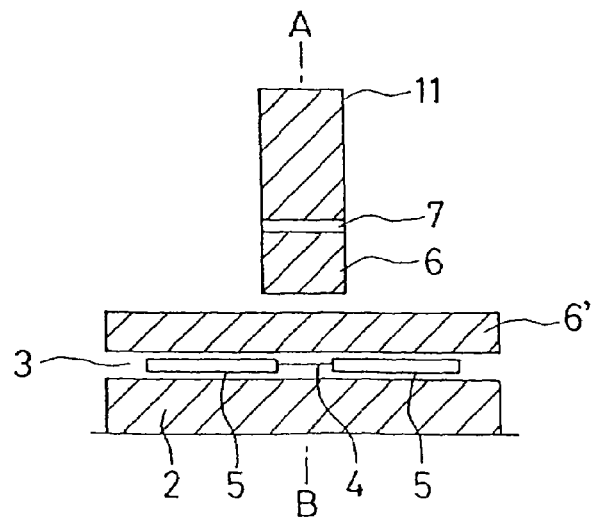
FIG. 16 is a structural diagram viewed from an ABS surface of a combined head according to a sixth embodiment of the present invention.
Figure 17:
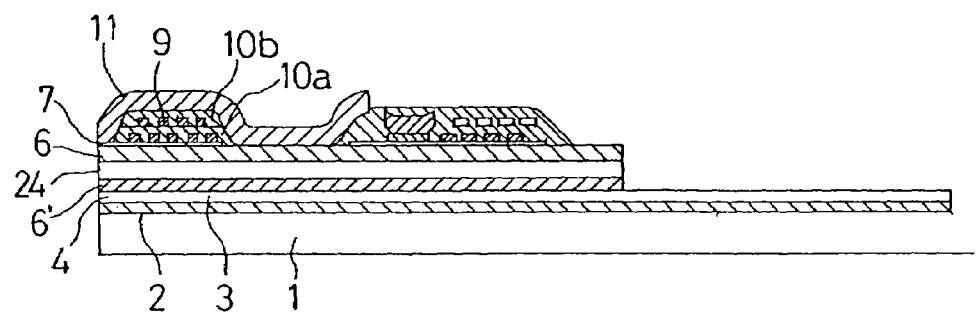
FIG. 17 is a cross section of the combined head according to the sixth embodiment of the present invention.

As shown in FIGS. 16 and 17, the combined head 50 using the recording head 60 manufactured in the present invention can be constituted so that the reproduction head 70 and the recording head 60 are independent, and thus the upper shield 6 and the lower recording core 6 are independent.

Figure 29:
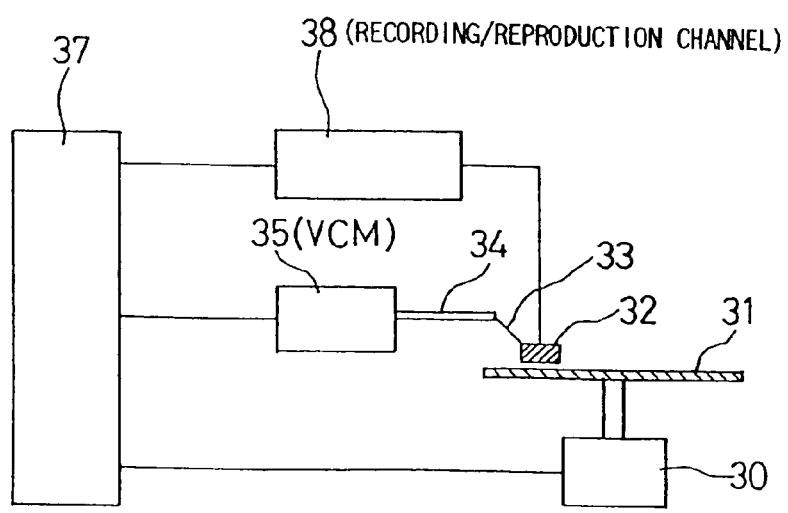
FIG. 29 is a structural diagram showing a structure of a magnetic recording/reproduction apparatus according to one embodiment of the present invention.
Figure 30A:
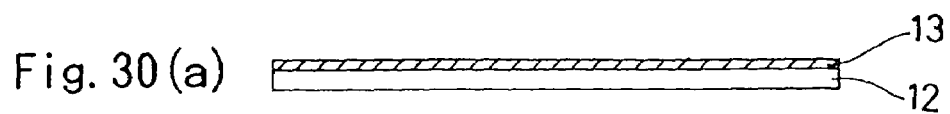
FIGS. 30(a) through 30(f) are step diagrams showing examples of the steps of manufacturing the recording head of the present invention.
Figure 30B:
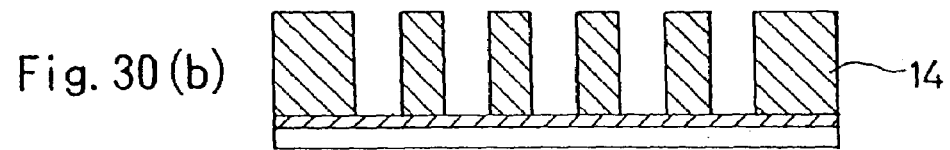
Figure 30C:
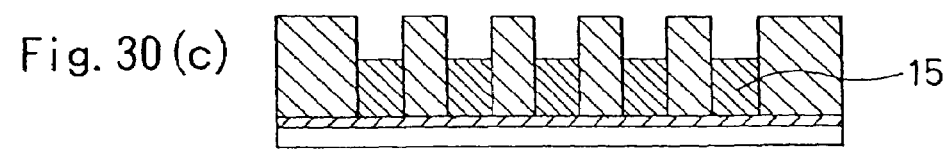
Figure 30D:
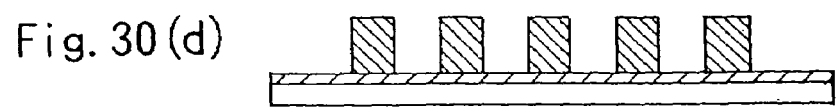
Figure 30E:
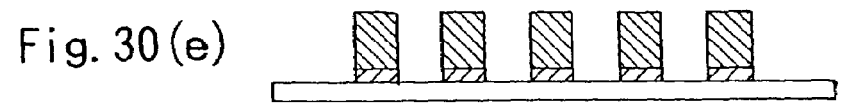
Figure 30F:
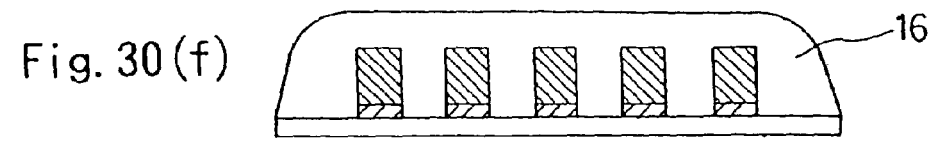

The structure of a magnetic recording/reproduction apparatus 80 to which the combined head 50 of the present invention is mounted is shown in FIG. 29. A head 32 of the present invention is installed by an suspension 33 and an arm 34 so as to be opposed to a magnetic recording surface of a magnetic medium 31 rotating by a driving-use motor 30. The head 32 is tracked by a voice coil motor (VCM) 35.

Figure 28:
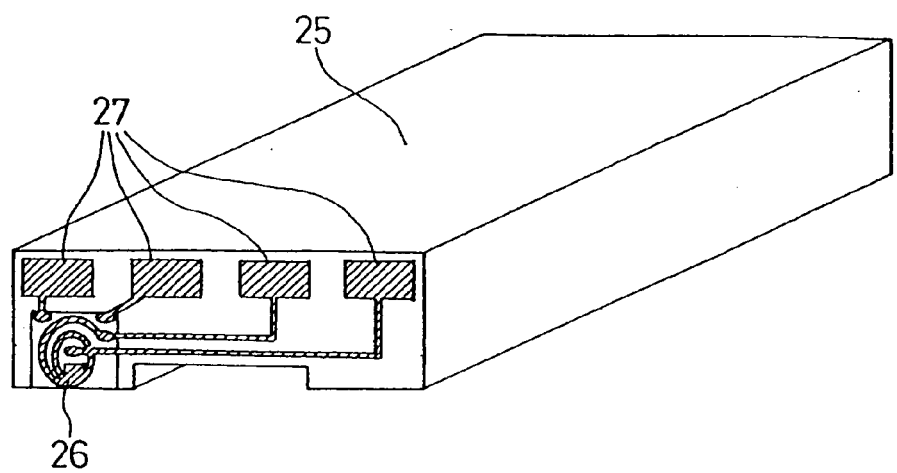
FIG. 28 is a diagram showing a slider to which the combined head of the present invention is mounted.

As shown in FIG. 28, the head 32 is composed of a slider 25, electrodes 27 and a recording/reproduction element (combined head) 26. The recording/reproduction operation is performed by a signal transmitted from a recording/reproduction channel 38 to the head.

The recording/reproduction channel 38, the VCM 935 for locating the head and the driving motor 30 for rotating the medium are linked by a control unit 37.

Next, there will be detailed below the method of manufacturing the combined head 50 according to one embodiment of the present invention with reference to FIG. 5 and the above-mentioned various conditions.

Namely, an alumina film 1b as an insulating material is formed on a combined ceramic la composed of alumina and titanium carbide to be a substrate 1 as a slider by the sputtering method.

Thereafter, a GMR head 70 having a reproducing function and an ID head 60 having a recording function are formed in this order.

The GMR head 70 which serves as the reproduction head 70 of the present embodiment is formed in the following procedure.

At first, after a Co—Ta—Zr film to be a lower shield 2 is formed into a thickness of 1 μm by the sputtering method, this film is etched by an ion beam using a photoresist mask so that a pattern is formed.

Next, an alumina film for forming a reproduction gap 3 corresponding to a magnetic separation layer into a thickness of 0.03 μm by the sputtering method.

Thereafter, a spin-valve laminated structure to be a center area 4 is formed thereon by the sputtering method. The spin-valve laminated structure is formed in a manner that a primary Zr film (having a thickness of 3 nm), a Pt—Mn film (having a thickness of 20 nm), a Co—Fe film (having a thickness of 2 nm), a Cu film (having a thickness of 2.1 nm), a Co—Fe film (having a thickness of 0.5 nm), an Ni—Fe film (having a thickness of 2 nm) and a Zr film (having a thickness of 3 nm) are laminated from on the side of the lower shield 2 in this order. Further, the structure is etched by an ion beam using a photoresist mask so that a pattern is formed.

Next, a laminated structure film to be an end area 5 composed of a Co—Pt film (thickness: 20 nm) and an Au film (thickness: 50 nm) is formed by the sputtering method using this photoresist mask, and the photoresist mask is lifted off so that an MR element 4 is finished.

An alumina film for forming another reproduction gap 3 is formed into a thickness of 0.057 μm on the MR element 4 by the sputtering method. The reproduction gap length is 0.12 μm.

On the other hand, the ID head 60 of the present invention is formed in the following procedure.

Namely, an upper shield 6 which serves also as a recording electrode is formed by a method of growing a plated film in a frame of a photoresist.

Plating bath conditions of a permalloy film composing the upper shield 6b used in the present embodiment are as follows:

| Name | Concentration (mol/L) |
|---|---|
| Nickel chloride | 0.16 |
| Nickel sulfate | 0.08 |
| Sodium Chloride | 0.42 |
| Boron | 0.40 |
| Na saccharin | 0.0072 |
| Ferrous sulfate | 0.0045 |
| Na lauryl sulfate | 0.00035 |
| 36% hydrochloric acid | 0.0017 |
| PH | 2.6 |
| Current density | 6 mA/cm$^2$ |

Further, plating bath conditions of the Co—Ni—Fe film composing the upper shield 6a are as follows:

| Name | Concentration (mol/L) |
|---|---|
| Cobalt sulfate | 0.092 |
| Nickel sulfate | 0.20 |
| Ammonium chloride | 0.28 |
| Boron | 0.40 |
| Ferrous sulfate | 0.0016 |
| Na lauryl sulfate | 0.00035 |
| 80% sulfonic acid | 0.0012 |
| PH | 2.8 |
| Current density | 15 mA/cm$^2$ |

The above-mentioned first magnetic core 6 also serves as the upper shield 6, and a recording gap 7 made of alumina with a film thickness of 0.18 μm is deposited on the upper shield 6 by the sputtering method.

A first layer of coils 9 is formed thereon by a method of growing a Cu plated film in a frame of a photoresist, and a non-magnetic insulating material 10a made of photoresist is formed. A second layer of the coils 9 is formed in the same manner, and a non-magnetic insulating material 10b made of photoresist is formed.

These steps are shown in FIG. 30.

When a magnetic core with yoke length L of 9.5 μm is produced, as shown in FIG. 5, it has a two-layered coils structure of a 5-turn first layer and a 4-turn second layer. As a result, the magnetic core can be produced with a coil thickness of 1 μm, a coil width of 1 μm and a coil gap of 0.3 μm.

At this time, W1 and W2 shown in FIG. 4 become 1.4 μm when throat height is 0.5 μm. W1 and W2 satisfy the relationships: $W1/d \geq 0.5$, $W2/d \geq 0.5$, $W'/d \geq 0.5$ and $W2'/d \geq 0.5$.

In addition, in order to satisfy $h/d \geq 0.2$, $H'/d' \geq 0.2$, $h(h') \geq 0.2\mu$, and the magnetic core can be manufactured sufficiently under these conditions.

The coil resistance at this time was about 18Ω.

As a cross section of the coils is smaller, the resistance increases, but a coil width on a portion which does not cross the magnetic core is enlarged so that the resistance value can be maintained small.

In FIG. 5, when d and d' are 1 μm, and h and h' are 0.5 μm, the heights of the structures of the two-layered coils and the insulating material become 3 μm.

Conventionally since it is standard that the coil width is 2 μm, the coil thickness is 2 μm and the thickness of the insulating film on the coils is about 2 μm in the head with long yoke length L, the heights of the two-layer coils and the insulating material are about 8 μm.

In the recording head 60 of the present invention, when the magnetic core 11, a level difference in the heights between the coils and the insulating material could be greatly reduced from 8 μm to 3 μm.

Figure 27:
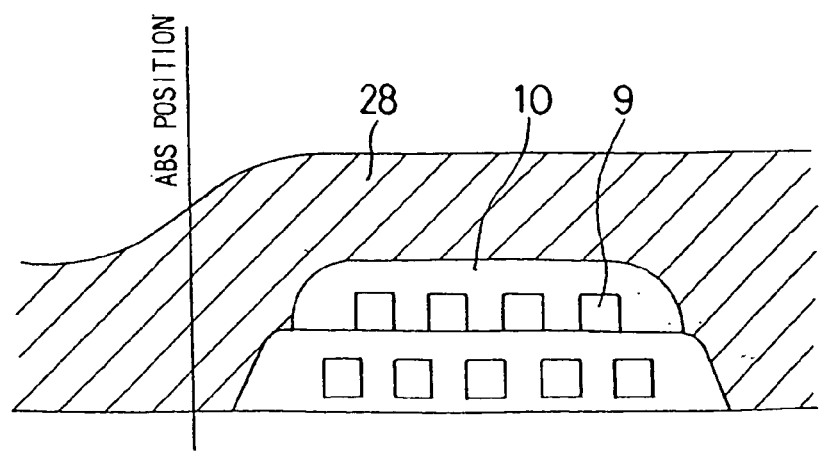
FIG. 27 is a cross section showing that a photoresist for forming a magnetic core is applied to a coil/insulating material structure.

When the second magnetic core 11 is formed, as shown in FIG. 27, a photoresist 28 is applied to the level difference between the coils/insulating material.

At this time, it was conventionally necessary to apply a resist of about 5 μm in order to form the magnetic core with film thickness of about 3 μm. However, a resist thickness in a vicinity of ABS where a pattern should be formed with the most narrow width for determining the recording width reached about 10 μm due to an influence of the level difference. Therefore, the most narrowest width where a pattern can be formed in the conventional head was about 1 μm.

On the contrary, in the recording head 60 of the present invention, the level difference between the coils and insulating material is low, i.e., about 3 µm, and the film thickness of the magnetic core can be thin. As a result, the resist thickness in the vicinity of ABS is not more than 5 µm, and a pattern of about 0.5 µm can be formed.

On the other hand, a second magnetic pole 11 used a Co—Ni—Fe film with Bs of 2 T. The plating bath conditions of the Co—Ni—Fe film are as follows:

| Name | Concentration (mol/L) |
|---|---|
| Cobalt sulfate | 0.092 |
| Nickel sulfate | 0.20 |
| Ammonium chloride | 0.28 |
| Boron | 0.40 |
| Ferrous sulfate | 0.0016 |
| Na lauryl sulfate | 0.00035 |
| 80% sulfonic acid | 0.0012 |
| PH | 2.8 |
| Current density | 15 mA/cm$^2$ |

Next, a fifth embodiment of the present invention shown in Table 3 is shown as the structure of the combined head 50 in FIG. 15.

The structures of the substrate 1 to be a slider, the lower shield 2, the GMR element 4, the recording gap 7 and the upper shield 6 are the same as those in the first embodiment of the present invention. The yoke length L in the present invention is 5 µm. The present embodiment and comparative example 15 of the head of the present invention are shown in Table 3.

There will be described below a manufacturing method of the fifth embodiment. In the present embodiment, a completely new method shown in FIG. 31 is used for the method of manufacturing the coils 9 and the insulating materials 10a and 10b.

At first, an SiO$_2$ film with a thickness of 1 µm were deposited on the alumina film composing the recording gap 7 so that a pattern 17 was formed (FIG. 31(a)).

Next, resist patterns 18 were formed on the SiO$_2$ insulating material film pattern 17 at the step of forming groove sections for forming coils (FIG. 31(b)).

Next, etching was carried out by using the resist pattern and CF4 gas (FIG. 31(c)). The etching depth was 0.8 µm.

Next, the resist pattern was removed (FIG. 31(d)), a TaN primary layer 19 and a Cu seed layer 20 were formed on the insulating material pattern where the groove sections were formed (FIG. 31(e)). A Cu film 21 was formed on the seed layer by plating (FIG. 31(f)).

Next, the Cu film formed on a portion other than the groove sections was removed by mechanical abrasion, and the height of the surface of the Cu film 22 formed in the groove sections and the height of the surface of the insulating material film on the portion other than the groove sections was arranged so as to be level with each other (FIG. 31(g)).

Finally, the Cu coils formed in the groove sections and the surface of the insulating material film on the portion other than the groove sections were covered with an SiO$_2$ insulating material 23 with a film thickness of 0.2 µm so that a structure of the coils and the insulating material was finished.

With this method, the coil width is 0.4 µm, the coil thickness (height) is 0.7 µm, the coil gap is 0.3 µm, throat height is 0.5 µm, and SiO$_2$ width between the side surface of the outermost coils and the magnetic core is 0.65 µm so that the yoke length of 5 µm is realized.

In addition, the height of the structure of the coils and the insulating material was only 1.1 µm. Due to this low level difference, the pattern with width of about 0.3 µm could be formed in the vicinity of the ABS surface.

Therefore, this process is effectively only to form the magnetic core with short yoke length but also to manufacture the magnetic head with narrow track width.

Next, the structure of the combined head according to a sixth embodiment of the present invention is shown in FIGS. 16 and 17.

Namely, FIG. 16 is a plan view showing the structure viewed from the ABS surface 40 opposed to the recording medium 31. FIG. 17 is a cross section vertical to the ABS surface 40, namely, a cross section taken along line A–B in FIG. 16.

In the present embodiment, the upper shield 6' of the reproduction GMR head 70 and the lower magnetic core 6 of the recording head 60 are independent, and they are separated by a non-magnetic layer 24.

The upper shield 6' in the present embodiment is a permalloy film with a thickness of 2 µm.

In addition, its yoke length L is 9.5 µm, the lower magnetic core 6 and the upper magnetic core 11 are composed of a Co—Ni—Fe film with a thickness of 1 µm (having a composition showing the soft magnetic characteristic, for example, 65Co12Ni23Fe).

Also in the combined head 50 of the present embodiment, the output fluctuation according to the recording operation was not more than 0.5%, 30% Roll-off frequency of the inductance was 390 MHz and 0/W was 45 dB, that was satisfactory.

On the other hand, a seventh embodiment of the present invention is a magnetic recording/reproduction apparatus 80 to which the combined head 50 including the recording head 60 of the present invention is mounted.

As shown in FIG. 29, a head 32 of the present invention is installed by an suspension 33 and an arm 34 so as to be opposed to the magnetic recording surface of a magnetic medium 31 rotated by a driving motor 30, and the head 32 is tracked by a voice coil motor (VCM) 35.

As shown in FIG. 28, the head 32 is composed of a slider 25, an electrode 27 and a recording/reproduction element (combined head) 26.

The recording/reproduction operation is performed by a signal from a recording/reproduction channel 38 of the head. The recording/reproduction channel, VCM for locating the head and the driving motor for rotating the medium are linked by a control unit 37.

The magnetic recording/reproduction apparatus is a storage device with high density and large capacity and also a storage device which is advantageous to data transmission at high speed.

Further, the combined head 50 is characterized in that one of first and second magnetic cores serves also as a first magnetic shield, and a magnetoresistive effect element 4, which is provided between the first magnetic shield (upper shield) and a second magnetic shield (lower shield) opposed to the first magnetic shield, carries out reproduction, and recording is carried by the recording head 60.

In addition, the combined head 50 is characterized in that the magnetoresistive effect element 4, which is provided between the first magnetic shield (upper shield) and the second magnetic shield (lower shield) opposed to each other, carries out reproduction, and recording is carried out by the recording head 60 laminated on the element 4.

The magnetic recording/reproduction apparatus 80 according to the above embodiment of the present invention is constituted so that the combined head 50 is mounted thereinto.

According to the present invention, in the first place even in the case where the Co—Ni—Fe film or 45NiFe film with great saturation magnetization for realizing high recording ability is applied to the upper shield of the combined head, the recording head and the combined head where a reproduction noise is suppressed are realized.

In the second place, the Co—Ni—Fe film which can obtain saturation magnetization of 2 T is used as the magnetic core material with great saturation magnetization so that the recording head, in which the high saturation magnetization characteristic of the Co—Ni—Fe film can be utilized as a recording characteristic maximally, is provided.

In the third place, the recording head in which the recording performance is high at high frequency is provided.

In the fourth place, the recording head, in which the track width is narrow according to high-density recording, can be provided.

In the fifth place, the methods of manufacturing the recording head and the combined head can be provided.

In the sixth place, the storage device, which is suitable for high-speed data transmission with large capacity, is realized by the magnetic recording/reproduction apparatus to which the recording head and the combined head are mounted.

What is claimed is:

1. A recording head, comprising:
a first magnetic core;
a second magnetic core arranged opposite to said first magnetic core;
a recording gap formed by one end of said first magnetic core and one end of said second magnetic core;
a magnetic couple formed by the other ends of said first and second magnetic cores; and
a coil, insulated by an insulating material, between said first and said second magnetic cores, whereby magnetic fluxes of said first and said second magnetic cores excited by said coil and leaked from said recording gap are used for recording information onto a magnetic medium,
wherein a yoke length between a front end of said recording head, in proximity of said recording gap, and a contact point of said magnetic couple, is not more than 20 μm;
wherein said magnetic material forming each one of said first and said second magnetic cores each opposing to each other, has a configuration in that a plurality of magnetic material layers are laminated with each other and further wherein, with respect to the yoke length L (unit: μm), a total sum Σ of a product of a saturation magnetization (unit: T) and the film thickness (unit: μm) of the respective magnetic materials composing the respective magnetic cores, (Σ(saturation magnetization (T)×film thickness (μm))) satisfies the following relationship:

0.05 (T)×yoke length $L$ (μm)+0.5 (T μm)<=SIGMA (saturation magnetization (T)×film thickness (μm)).

2. A recording head, comprising:
a first magnetic core;
a second magnetic core arranged opposite to said first magnetic core;
a recording gap formed by one end of said first magnetic core and one end of said second magnetic core;
a magnetic couple formed by the other ends of said first and second magnetic cores; and
a coil, insulated by an insulating material, between said first and said second magnetic cores, whereby magnetic fluxes of said first and said second magnetic cores excited by said coil and leaked from said recording gap are used for recording information onto a magnetic medium,
wherein a yoke length between a front end of said recording head, in proximity of said recording gap, and a contact point of said magnetic couple, is not more than 20 μm; and
wherein with respect to the yoke length, a product of a saturation magnetization of said first and second magnetic cores, and the film thickness of the magnetic materials composing each of said first and second magnetic cores, respectively, satisfies:

0.05 (T)×yoke length L (μm)+0.5 (T μm)≦saturation magnetization (T)×film thickness (μm) wherein said coil which is configured so as to pass through a space formed between said first and said second magnetic cores, oppositely arranged to each other, via said insulating material, and further wherein a width of said coil passing through said space is equal to or narrower than that of said coil arranged in a portion other than said space.

3. A recording head, comprising:
a first magnetic core;
a second magnetic core arranged opposite to said first magnetic core;
a recording gap formed by one end of said first magnetic core and one end of said second magnetic core;
a magnetic couple formed by the other ends of said first and second magnetic cores; and
a coil, insulated by an insulating material, between said first and said second magnetic cores, whereby magnetic fluxes of said first and said second magnetic cores excited by said coil and leaked from said recording gap are used for recording information onto a magnetic medium,
wherein a yoke length between a front end of said recording head, in proximity of said recording gap, and a contact point of said magnetic couple, is not more than 20 μm; and
wherein with respect to the yoke length, a product of a saturation magnetization of said first and second magnetic cores, and the film thickness of the magnetic materials composing each of said first and second magnetic cores, respectively, satisfies:

0.05 (T)×yoke length L (μm)+0.5 (T μm)≦saturation magnetization (T)×film thickness (μm), wherein said coil which is configured so as to pass through a space formed between said first and said second magnetic cores, oppositely arranged to each other, via said insulating material, and further wherein a width of said coil is optionally changed so that a resistance value of said coils becomes smaller than that of said coil said width thereof being set at constant value.

4. A method of manufacturing a recording head, which comprises:
a first magnetic core;
a second magnetic core arranged opposite to said first magnetic core;
a recording gap formed by one end of said first magnetic core and one end of said second magnetic core;

a magnetic couple formed by the other ends of said first and second magnetic cores; and a coil, insulated by an insulating material, between said first and said second magnetic cores, whereby magnetic fluxes of said first and said second magnetic cores excited by said coil and leaked from said recording gap are used for recording information onto a magnetic medium, wherein a yoke length between a front end of said recording head, in proximity of said recording gap, and a contact point of said magnetic couple, is not more than 20 μm; and wherein with respect to the yoke length, a product of a saturation magnetization of said first and second magnetic cores, and the film thickness of the magnetic materials composing each of said first and second magnetic cores, respectively, satisfies:

0.05 (T)×yoke length $L$ (m)+0.5 (T μm)≦saturation magnetization (T)×film thickness (μm), said method comprising;

forming a seed layer on an insulating material film;

forming resist patterns on said seed layer;

depositing a coil material among said resist patterns by means of plating;

removing said resist patterns therefrom;

removing said seed layer; and covering said coil material with an insulating material.

5. The method according to claim 4, wherein covering said coil material with an insulating material is carried out by spin coating process.

6. The method according to claim 4, wherein assuming that a thickness of said coils being d (μm) and distances from said outermost coil to an end of said insulation material covering said coils being W1 and W2 (μm), respectively, said distances W1 and W2 (μm) satisfy said following relationships, respectively:

$W1/d \geq 0.5$ and $W2/d \geq 0.5$.

7. The method according to claim 4, wherein assuming that a thickness of said coil being d (μm) and a thickness of said insulating material covering said coil on said coil being h (μm), said thickness h (μm) satisfies said following relationship:

$h/d \geq 0.2$.

8. A method of manufacturing a coil on a recording head, which comprises:

a first magnetic core;

a second magnetic core arranged opposite to said first magnetic core;

a recording gap formed by one end of said first magnetic core and one end of said second magnetic core;

a magnetic couple formed by the other ends of said first and second magnetic cores; and the coil, insulated by an insulating material, between said first and said second magnetic cores, whereby magnetic fluxes of said first and said second magnetic cores excited by said coil and leaked from said recording gap are used for recording information onto a magnetic medium, wherein a yoke length between a front end of said recording head, in proximity of said recording gap, and a contact point of said magnetic couple, is not more than 20 μm; and wherein with respect to the yoke length, a product of a saturation magnetization of said first and second magnetic cores, and the film thickness of the magnetic materials composing each of said first and second magnetic cores, respectively, satisfies:

0.05 (T)×yoke length $L$ (μm)×0.5 (T μm)≦saturation magnetization (T)×film thickness (μm), said method comprising;

forming an insulation film;

forming groove sections for forming coils on said insulation;

forming a seed layer on said insulation film where said groove sections have been formed;

forming a coil material on said seed layer by means of plating;

removing said coil material formed on a portion other than said groove sections and adjusting a height of said surface of said coil material formed on said groove sections and a height of said surface of said insulation film so that both heights coincide with each other; and covering said coil material formed in said groove sections and said surface of said insulation film with an insulation material.

9. The method according to claim 4, wherein said seed layer is mainly formed with Cu, and said seed layer is formed on a primary layer composed of at least one kind of elements selected from a group of Ta, TaN, Ti and TiN.

10. A combined head comprising:

a first magnetic core;

a second magnetic core arranged opposite to said first magnetic core;

a recording gap formed by one end of said first magnetic core and one end of said second magnetic core;

a magnetic couple formed by the other ends of said first and second magnetic cores; and a coil, insulated by an insulating material, between said first and said second magnetic cores, whereby magnetic fluxes of said first and said second magnetic cores excited by said coil and leaked from said recording gap are used for recording information onto a magnetic medium, wherein a yoke length between a front end of said recording head, in proximity of said recording gap, and a contact point of said magnetic couple, is not more than 20 μm; and wherein with respect to the yoke length, a product of a saturation magnetization of said first and second magnetic cores, and the film thickness of the magnetic materials composing each of said first and second magnetic cores, respectively, satisfies:

0.05 (T)×yoke length L (μm)+0.5 (T μm)<=saturation magnetization (T)×film thickness (μm), wherein said coil which is configured so as to pass through a space formed between said first and said second magnetic cores, oppositely arranged to each other, via said insulating material, and further wherein a width of said coil is optionally changed so that a resistance value of said coils becomes smaller than that of said coil said width thereof being set at constant value, either one of said first and second magnetic cores is used as a first magnetic shield, while a reproduced process can be carried out by a magnetoresistive effect element which is provided between said first magnetic shield and a second magnetic shield oppositely arranged to said first magnetic shield.

11. A combined head according to claim 10, wherein a relationship between a reproduction output of said magnetoresistive effect element and a standard deviation of said output of said satisfies the following formula;

(standard deviation) (average of reproduction outputs) ≦ 0.01.

12. A magnetic recording/reproduction apparatus which is provided with said combined head according to claim 10.

* * * * *